US011669693B2

(12) United States Patent
Choi et al.

(10) Patent No.: US 11,669,693 B2
(45) Date of Patent: *Jun. 6, 2023

(54) ELECTRONIC APPARATUS, CONTROLLING METHOD OF THEREOF AND NON-TRANSITORY COMPUTER READABLE RECORDING MEDIUM

(71) Applicant: SAMSUNG ELECTRONICS CO., LTD., Suwon-si (KR)

(72) Inventors: Chang-hwan Choi, Seoul (KR); Ji-hwan Yun, Suwon-si (KR); Man-un Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,599

(22) Filed: Jul. 16, 2021

(65) Prior Publication Data

US 2021/0342555 A1 Nov. 4, 2021

Related U.S. Application Data

(63) Continuation of application No. 15/922,014, filed on Mar. 15, 2018, now Pat. No. 11,068,667.

(30) Foreign Application Priority Data

Mar. 23, 2017 (KR) ........................ 10-2017-0037129
Nov. 21, 2017 (KR) ........................ 10-2017-0155897

(51) Int. Cl.
*G10L 15/22* (2006.01)
*G06F 40/40* (2020.01)
(Continued)

(52) U.S. Cl.
CPC .............. *G06F 40/40* (2020.01); *G06F 40/30* (2020.01); *G06N 3/045* (2023.01); *G06N 3/084* (2013.01);
(Continued)

(58) Field of Classification Search
CPC ... G10L 15/22; G10L 2015/223; G10L 15/18; G10L 25/63; G10L 15/1815; G06F 17/28;
(Continued)

(56) References Cited

U.S. PATENT DOCUMENTS 7,505,892 B2   3/2009   Foderaro
9,648,171 B1   5/2017   Eftekhari
(Continued)

FOREIGN PATENT DOCUMENTS

JP   2013-037401   2/2013
KR   10-2008-0075748   8/2008
(Continued)

OTHER PUBLICATIONS

European Decision to Refuse dated Jun. 15, 2022 for EP Application No. 18772684.9.
(Continued)

*Primary Examiner* — Jakieda R Jackson
(74) *Attorney, Agent, or Firm* — Nixon & Vanderhye P.C.

(57) ABSTRACT

An electronic apparatus includes an input unit comprising input circuitry configured to receive a natural language input, a communicator comprising communication circuitry configured to perform communication with a plurality of external chatting servers, and a processor configured to analyze a characteristic of the natural language and a characteristic of the user and to identify a chatting server corresponding to the natural language from among the plurality of chatting servers, and to control the communicator to transmit the natural language to the identified
(Continued)

chatting server in order to receive a response with respect to the natural language.

23 Claims, 16 Drawing Sheets

(51) Int. Cl.
| | | |
|---|---|---|
| *H04L 51/04* | (2022.01) | |
| *G06N 3/084* | (2023.01) | |
| *H04L 51/02* | (2022.01) | |
| *G06F 40/30* | (2020.01) | |
| *G06N 3/045* | (2023.01) | |
| *G06N 20/00* | (2019.01) | |
| *G06N 3/006* | (2023.01) | |

(52) U.S. Cl.
CPC .............. *H04L 51/02* (2013.01); *H04L 51/04* (2013.01); *G06N 3/006* (2013.01); *G06N 20/00* (2019.01)

(58) Field of Classification Search
CPC .. G06F 40/30; G06F 16/9535; G06F 16/3344; G06F 16/3329; G06F 40/20; G06N 20/00; G06N 3/08
See application file for complete search history.

(56) References Cited

U.S. PATENT DOCUMENTS

| 11,068,667 | B2 | 7/2021 | Choi et al. |
|---|---|---|---|
| 2001/0037197 | A1 | 11/2001 | Boulanov |
| 2004/0029093 | A1 | 2/2004 | Guignard |
| 2004/0205645 | A1 | 10/2004 | Hoffman |
| 2008/0020361 | A1 | 1/2008 | Kron |
| 2009/0204400 | A1 | 8/2009 | Shields et al. |
| 2009/0246744 | A1 | 10/2009 | Lofthus |
| 2013/0238326 | A1 | 9/2013 | Kim |
| 2013/0325779 | A1 | 12/2013 | Shahshahani |
| 2013/0339013 | A1 | 12/2013 | Higashi et al. |
| 2014/0099082 | A1 | 4/2014 | Miller |
| 2014/0236579 | A1 | 8/2014 | Kurz |
| 2014/0244712 | A1 | 8/2014 | Walters |
| 2014/0257795 | A1 | 9/2014 | Birnbaum |
| 2014/0310002 | A1 | 10/2014 | Nitz |
| 2015/0037765 | A1 | 2/2015 | Jaggi |
| 2015/0248651 | A1 | 9/2015 | Akutagawa |
| 2015/0301729 | A1 | 10/2015 | Wang |
| 2016/0035353 | A1 | 2/2016 | Chen et al. |
| 2016/0067612 | A1 | 3/2016 | Ntoulas |
| 2016/0092035 | A1 | 3/2016 | Crocker |
| 2016/0098992 | A1 | 4/2016 | Renard |
| 2016/0142544 | A1 | 5/2016 | Oh et al. |
| 2016/0155443 | A1 | 6/2016 | Khan |
| 2017/0004722 | A1 | 1/2017 | Dragos |
| 2017/0019356 | A1 | 1/2017 | Gilbert |
| 2017/0048170 | A1 | 2/2017 | Smullen et al. |
| 2017/0140449 | A1 | 5/2017 | Kannan |
| 2017/0188976 | A1 | 7/2017 | Kalra |
| 2017/0236512 | A1 | 8/2017 | Williams |
| 2018/0061420 | A1 | 3/2018 | Patil |
| 2018/0108351 | A1 | 4/2018 | Beckhardt |
| 2018/0150739 | A1 | 5/2018 | Wu |
| 2018/0166074 | A1 | 6/2018 | Aggarwal |
| 2018/0204569 | A1 | 7/2018 | Nadkar |

FOREIGN PATENT DOCUMENTS

| KR | 10-2015-0065523 | 6/2015 |
|---|---|---|
| KR | 10-2016-0060243 | 5/2016 |
| KR | 10-1647949 | 8/2016 |
| WO | WO 2008-119270 A1 | 10/2008 |
| WO | 2011/088053 | 7/2011 |
| WO | 2016/108873 | 7/2016 |

OTHER PUBLICATIONS

U.S. Appl. No. 15/922,014, filed Mar. 15, 2018; Choi et al.
India Examination Report dated Jul. 6, 2021 for IN Application No. 201947043055.
Search Report dated Jun. 29, 2018 in counterpart International Patent Application No. PCT/KR2018/002766.
Written Opinion dated Jun. 29, 2018 in counterpart International Patent Application No. PCT/KR2018/002766.
Extended European Search Report dated Oct. 21, 2019 for EP Application No. 18772684.9.
European Summons to attend oral proceedings dated Oct. 21, 2021 for EP Application No. 18772684.9.
Extended European Search Report dated Nov. 24, 2022 for EP Application No. 22189949.5.
Chinese Office Action dated Jan. 5, 2023 for CN Application No. 201880019376.3.

FIG. 6

| | MATCHING BOT | | | | |
|---|---|---|---|---|---|
| | CHATTING BOT A | CHATTING BOT B | CHATTING BOT C | ... | CHATTING BOT N |
| SENTENCE ANALYSIS PROBABILITY SCORE CALCULATION | 0.6 | 0.6 | 0.6 | | 0.6 |
| DIALOGUE PATTERN PROBABILITY SCORE CALCULATION | 0.2 | 0.5 | 0.8 | | 0.3 |
| EMOTION ANALYSIS PROBABILITY SCORE CALCULATION | 0.3 | 0.6 | 0.7 | | 0.2 |
| AGE/GENDER ANALYSIS PROBABILITY SCORE CALCULATION | 0.4 | 0.7 | 0.6 | | 0.4 |
| METADATA ANALYSIS PROBABILITY SCORE CALCULATION | 0.2 | 0.3 | 0.4 | | 0.4 |
| USER LOG ANALYSIS PROBABILITY SCORE CALCULATION | 0.2 | 0.4 | 0.5 | | 0.3 |
| FINAL PROBABILITY PROBABILITY SCORE CALCULATION | 1.9 | 3.1 | 3.6 | | 2.2 |

FIG. 7A

| WORD | WEIGHT |
|---|---|
| CABLE | 5.0 |
| LIQUID CRYSTAL | 4.5 |
| ... | ... |
| HI | 0.1 |

FIG. 7B

| WORD | SCORE |
|---|---|
| PROBLEM | 3.0 |
| BROKEN | 2.2 |
| ... | ... |
| HMM | 0.6 |

FIG. 8

|  | HI | I | PROBLEM | OCCURS | DEAL WITH | PLEASE | SHORTLY |
|---|---|---|---|---|---|---|---|
| USER | 3 | 0 | 2 | 1 | 1 | 1 | 2 |
| BEGINNER LEVEL | 2 | 2 | 1 | 2 | 3 | 2 | 3 |
| INTERMEDIATE LEVEL | 1 | 0 | 3 | 4 | 2 | 3 | 2 |
| ADVANCED LEVEL | 3 | 2 | 2 | 1 | 5 | 4 | 1 |

ELECTRONIC APPARATUS, CONTROLLING METHOD OF THEREOF AND NON-TRANSITORY COMPUTER READABLE RECORDING MEDIUM

CROSS-REFERENCE TO RELATED APPLICATIONS

This application is a Continuation of U.S. application Ser. No. 15/922,014, filed Mar. 15, 2018 (now U.S. Pat. No. 11,068,667), which claims priority to KR 10-2017-0037129 filed Mar. 23, 2017 and KR-10-2017-0155897, filed Nov. 21, 2017, the entire contents of which are all hereby incorporated herein by reference in their entireties.

BACKGROUND

1. Field

The disclosure relates to an electronic apparatus, a controlling method thereof, and a non-transitory computer readable recording medium, and for example, to an electronic apparatus capable of matching a chatting server at a difficulty level of user utterance, a controlling method thereof and a non-transitory computer readable recording medium.

In addition, the present disclosure relates to an Artificial Intelligence (AI) system that imitates the functions of human brain such as recognition and determination using a machine learning algorithm and applications thereof

2. Description of Related Art

The Artificial Intelligence (AI) system is a computer system that may implement a human-level intelligence, and unlike the conventional rule-based smart system, the Artificial Intelligence (AI) system is a smart system where a machine trains and determines by itself and gets smarter. The use of artificial intelligence system increases a recognition rate and facilitates understanding a user's taste more accurately. Therefore, the conventional rule-based smart system has been gradually replaced by a deep-learning based artificial intelligence system.

The artificial intelligence technology includes a machine learning (ex. deep-learning) technology and elemental technologies which utilize the machine learning technology. The machine learning technology may refer, for example, to an algorithm technique which sorts characteristics of input data and trains by itself The elemental technology uses a machine learning algorithm such as the deep-learning and includes the techniques such as linguistic understanding, visual understanding, inference/prediction, knowledge representation, motion control, etc.

The artificial intelligence technology is applied to various technical fields. For example, linguistic understanding is a technique for recognizing and applying/processing human language/characters and includes the functions of natural language processing, machine translation, dialogue system, query response, voice recognition/synthesis, and the like. Visual understanding is a technique for recognizing and processing objects from a human's point of view, including object recognition, object tracking, image search, human recognition, scene understanding, spatial understanding, image enhancement, and the like. The inference/prediction is a technique for determining, logically inferring and predicting information, including knowledge/probability based inference, optimization prediction, preference-based planning, recommendation, and the like. Knowledge representation is a technique for automating human experience information into knowledge data, including knowledge building (data generation/classification), knowledge management (data utilization), and the like. Motion control is a technique for controlling an autonomous running of a vehicle and the motion of the robot, including motion control (navigation, collision and running), operation control (behavior control), and the like.

An existing chatting server could not do much more than retrieving and providing a pre-stored response for not fully understanding user utterance. Since all the chatting servers are embodied to have the same specification, resources are overly used when even a simple question is processed.

SUMMARY

An aspect of the disclosure relates to providing an electronic apparatus capable of evaluating a difficulty level of natural language input by a user based on artificial intelligence technology and matching a chatting server having an optimal specification based on the evaluated difficulty level with the input natural language, a controlling method thereof and a non-transitory computer readable recording medium.

According to an example embodiment, an electronic apparatus is provided, the electronic apparatus including an input unit comprising input circuitry configured to receive a natural language input, a communicator comprising communication circuitry configured to perform communication with a plurality of external chatting servers, and a processor configured to analyze a characteristic of the natural language and a characteristic of a user and determine a chatting server corresponding to the natural language from among the plurality of external chatting servers, and to control the communicator to transmit the natural language to the determined chatting server to receive a response with respect to the natural language.

The processor may be further configured to perform a preprocessing of the natural language, to analyze a characteristic of the preprocessed natural language and the characteristic of the user and to determine a chatting server corresponding to the preprocessed natural language from among the plurality of external chatting servers, and to control the communicator to transmit the preprocessed natural language to the determined chatting server.

The processor may be further configured to with respect to each of the plurality of chatting servers, calculate (determine) at least one of a first matching score with respect to the preprocessed natural language, a second matching score with respect to a dialogue pattern including the preprocessed natural language, a third matching score with respect to emotion of the user and a fourth matching score with respect to the characteristic of the user, with respect to each of the plurality of chatting servers, to calculate (determine) a final matching score with respect to each of the plurality of chatting servers using at least one of the first to fourth matching scores, and to determine a chatting server having a highest final matching score from among the plurality of chatting servers as the chatting server corresponding to the preprocessed natural language.

The first matching score may be calculated (determined) based on weighted values given to words included in the preprocessed natural language and a Term Frequency/Inverse Document Frequency (TF/IDF) value, wherein the second matching score is calculated (determined) based on a similarity to pre-stored dialogue pattern data, wherein the third matching score is calculated (determined) based on sentiment analysis and emotion analysis of the preprocessed natural language, and wherein the fourth matching score is calculated (determined) based on at least one of: age, gender, region and education of the user.

The electronic apparatus may further include a memory configured to store history information of dialogues performed with the chatting server corresponding to the natural language and context information with respect to a situation to which the natural language is input.

The processor may be further configured to in response to receiving an additional natural language through the input unit after receiving the natural language, determine a chatting server corresponding to the additional natural language from among the plurality of external chatting servers by analyzing a characteristic of the additional natural language and the characteristic of the user, and in response to the chatting server corresponding to the natural language being different from the chatting server corresponding to the additional natural language, control the communicator to transmit the additional natural language to the chatting server corresponding to the additional natural language.

The processor may be further configured to control the communicator to transmit history information of dialogues performed with the chatting server corresponding to the natural language and context information along with the additional natural language to the chatting server corresponding to the additional natural language.

The plurality of chatting servers may include two or more of a first chatting server, a second chatting server and a third chatting server that provide the response with respect to the natural language input based on the characteristic of the natural language input and the characteristic of the user.

The first chatting server may be a chatting server that provides a response corresponding to the natural language input using a pre-stored response database, wherein the second chatting server is a chatting server that provides a response by determining a context of the natural language input using a first response model, and wherein the third chatting server is a chatting server that provides a response by inferring a question included in the natural language input using a second response model.

According to an example embodiment, a method for controlling an electronic apparatus including receiving a natural language input is provided, the method including, determining a chatting server corresponding to the natural language from among a plurality of external chatting servers by analyzing a characteristic of the natural language and a characteristic of the user, and transmitting the natural language to the determined chatting server to receive a response with regard to the natural language.

The method may further include performing a preprocessing of the natural language, wherein the determining includes analyzing a characteristic of the preprocessed natural language and the characteristic of the user and determining a chatting server corresponding to the preprocessed natural language from among the plurality of external chatting servers, and wherein the transmitting includes transmitting the preprocessed natural language to the determined chatting server.

The determining may further include with respect to each of the plurality of chatting servers, calculating (determining) a first matching score with respect to the preprocessed natural language, a second matching score with respect to a dialogue pattern including the preprocessed natural language, a third matching score with respect to emotion of the user and a fourth matching score with respect to the characteristic of the user, with respect to each of the plurality of chatting servers, calculating (determining) a final matching score for each of the plurality of chatting servers using at least one of the first to fourth matching scores, and determining a chatting server having a highest final matching score from among the plurality of external chatting servers as the chatting server corresponding to the preprocessed natural language.

The first matching score may be calculated (determined) based on weighted values given to words included in the preprocessed natural language and a Term Frequency/Inverse Document Frequency (TF/IDF) value, wherein the second matching score is calculated (determined) based on similarity to pre-stored dialogue pattern data, wherein the third matching score is calculated (determined) based on sentiment analysis and emotion analysis of the preprocessed natural language, and wherein the fourth matching score is calculated (determined) based on at least one of: age, gender, region and education of the user.

The method may further include storing history information of dialogues performed with the chatting server corresponding to the natural language and context information with respect to a situation to which the natural language is input.

The method may further include receiving an additional natural language from the user after receiving the natural language, determining a chatting server corresponding to the additional natural language from among the plurality of external chatting servers by analyzing a characteristic of the additional natural language and the characteristic of the user, and in response to the chatting server corresponding to the natural language being different from the chatting server corresponding to the additional natural language, transmitting the additional natural language to the chatting server corresponding to the additional natural language.

The transmitting of the additional natural language may include transmitting history information of dialogues performed with the chatting server corresponding to the natural language and context information along with the additional natural language to the chatting server corresponding to the additional natural language.

The plurality of chatting servers may include two or more of a first chatting server, a second chatting server and a third chatting server that provide the response with respect to the natural language input based on the characteristic of the natural language input and the characteristic of the user.

The first chatting server may be a chatting server that provides a response corresponding to the natural language input using a pre-stored response database, wherein the second chatting server is a chatting server that provides a response by determining a context of the natural language input using a first response model, and wherein the third chatting server is a chatting sever that provides a response by inferring a question included in the natural language input using a second response model.

According to an example embodiment, a computer program product is provided, the computer program product comprising commands, which when executed by a processor, cause an electronic apparatus to preform operations comprising: receiving a natural language input, determining a chatting server corresponding to the natural language from among a plurality of external chatting servers by analyzing a characteristic of the natural language and a characteristic of the user, and transmitting the natural language to the determined chatting server to receive a response with respect to the natural language.

According to various embodiments of the present disclosure, an optimal chatting server may be provided to a user by dynamically changing a chatting server according to a natural language input by a user. In addition, when a chatting-based user response service is provided, unnecessary use of resources may be reduced.

BRIEF DESCRIPTION OF THE DRAWINGS

The above and other aspects, features and attendant advantages of the present disclosure will become more apparent from the following detailed description, taken in conjunction with the accompanying drawings, in which like reference numerals refer to like elements, and wherein:

FIG. 6 is a table illustrating an example method for determining a difficulty level of a natural language according to an embodiment of the present disclosure;

FIGS. 7A and 7B are tables illustrating an example method for calculating matching scores by analyzing a natural language according to an embodiment of the present disclosure;

FIG. 8 is a table illustrating an example method for calculating matching scores by analyzing a dialogue pattern according to an embodiment of the present disclosure;

DETAILED DESCRIPTION

All the terms used in this disclosure including technical and scientific terms have the same meanings as would be generally understood by those skilled in the related art. However, these terms may vary depending on the intentions of the person skilled in the art, legal or technical interpretation, and the emergence of new technologies. In addition, some terms may be arbitrarily selected. These terms may have a meaning defined herein and, unless otherwise specified, may be construed based on the entire contents of this disclosure and common technical knowledge in the art.

The terms such as "first," "second," and so on may be used to describe a variety of elements, but the elements should not be limited by these terms. The terms are used simply to distinguish one element from other elements. For example, without departing from the scope of the present disclosure, the first component may be referred to as a second component, and similarly, the second component may also be referred to as a first component. The term "and/or" may include any combination of a plurality of related items or any of a plurality of related items.

The terms used in the application are merely used to describe particular example embodiments, and are not intended to limit the disclosure. Singular forms in the disclosure are intended to include the plural forms as well, unless the context clearly indicates otherwise. It will be further understood that terms such as "including" or "having," etc., are intended to indicate the existence of the disclosed features, numbers, operations, actions, components, parts, or combinations thereof, and are not intended to preclude the possibility that one or more other features, numbers, operations, actions, components, parts, or combinations thereof may exist or may be added.

In an example embodiment, 'a module', 'a unit', or 'a part' perform at least one function or operation, and may be realized as hardware, such as a processor or integrated circuit, software that is executed by a processor, or any combination thereof. In addition, a plurality of 'modules', a plurality of 'units', or a plurality of 'parts' may be integrated into at least one module and may be realized as at least one processor except for 'modules', 'units' or 'parts' that should be realized in a specific hardware.

Hereinafter, various example embodiments will be described in greater detail with reference to the accompanying drawings.

Figure 1:
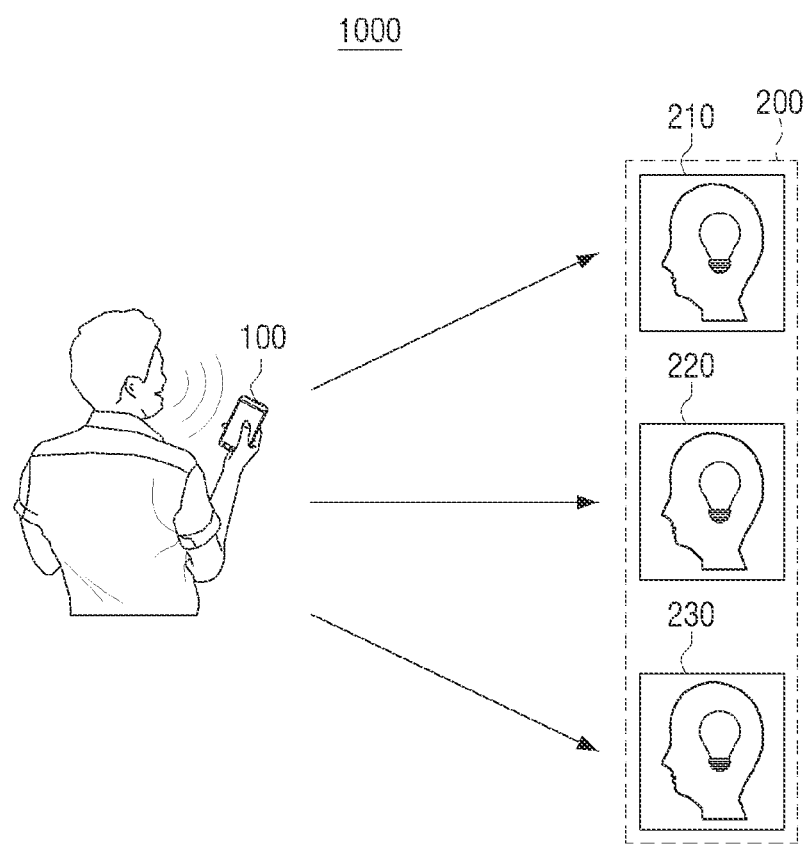
FIG. 1 is a diagram illustrating an example concept of a chatting bot system according to an embodiment of the present disclosure.

FIG. 1 is a diagram illustrating an example concept of a chatting bot system according to an embodiment of the present disclosure.

Referring to FIG. 1, a chatting bot system 1000 may include an electronic apparatus 100 and first, second and third chatting servers 210, 220 and 230. A plurality of chatting servers 210, 220 and 230 may have different specifications, resources and response processing models. For example, the plurality of chatting servers 210, 220 and 230 may have different CPU functions.

The chatting bot system 1000 may include the electronic apparatus 100 capable of responding to a natural language input by a user and a server 200. For example, examples of the electronic apparatus 100 may, for example, and without limitation, include a PC, a smart TV, a smart phone, a tablet PC, a voice recognition device, an audio device, or the like. The server 200 may include a series of chatting server devices, or may be embodied as a single device including a plurality of processors, each operating as a separate chatting bot.

According to an embodiment, the electronic apparatus 100 may select one of the plurality of chatting servers 210, 220 and 230 based on the natural language input by the user. The natural language input by the user, for example, may be a sentence the user uttered in voice or a sentence the user input in text format. The sentences the user uttered or entered may include both a subject and a verb, or may include one or more of subject, verb, or object. Alternatively, the sentences uttered or input by the user may include only specific words.

For example, the electronic apparatus 100 may determine whether the natural language relates to a simple query or requires language understanding through inference. Based on the result of determination, the electronic apparatus 100 may select one of the plurality of chatting servers 210, 220 and 230.

The electronic apparatus 100 may transmit the natural language input by the user to one of the plurality of chatting servers 210, 220 and 230 selected by the electronic apparatus. One of the plurality of chatting servers 210, 220 and 230 selected by the electronic apparatus may generate a response with respect to the natural language input by the user. Each of the plurality of chatting servers 210, 220 and 230 may include a different model for generating a response. For example, a beginner level model for generating a response to a specific natural language, an intermediate level model for grasping a context and an advanced level model for understanding a language by inference may, for example, and without limitation, be respectively stored in the plurality of chatting servers 210, 220 and 230.

According to another embodiment of the present disclosure, the electronic apparatus 100 may perform only an input/output function, and the server 200 may match a corresponding chatting server by analyzing a natural language.

According to another embodiment of the present disclosure, the electronic apparatus 100 may solely perform the above operations. The electronic apparatus 100 may operate in a plurality of chatting modes with different frequency of use of resources. For example, and without limitation, the electronic apparatus 100 may operate in one of a first chatting mode with the limited CPU performance of up to 20%, a second chatting mode with the limited CPU performance of up to 50%, and a third chatting mode with the limited CPU performance up to 100%. The electronic apparatus 100 may use a different response model depending on the degree of CPU performance limitation. For example, the electronic apparatus 100 may use a response model for a simple response when 20% of the CPU performance is used and a response model including an inference function when 100% of the CPU performance is used.

Hereinafter, as illustrated in FIG. 1, an example embodiment will be described where the electronic apparatus 100 determines a difficulty level of a natural language and matches a corresponding chatting server.

Figure 2:
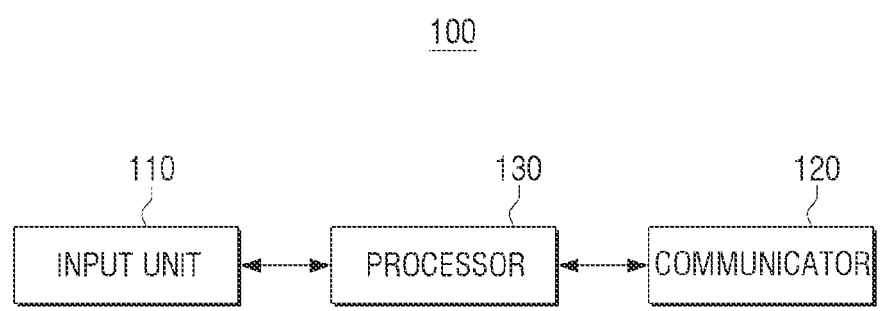
FIG. 2 is a block diagram illustrating an example configuration of an electronic apparatus according to an embodiment of the present disclosure.

FIG. 2 is a block diagram illustrating an example configuration of an electronic apparatus according to an embodiment of the present disclosure. Referring to FIG. 2, the electronic apparatus 100 may include an input unit (e.g., including input circuitry) 110, a communicator (e.g., including communication circuitry) 120 and a processor (e.g., including processing circuitry) 130.

The input unit 110 may include various input circuitry and receive a natural language from a user. For example, and without limitation, the input unit 110 may be embodied as a microphone, or the like, to receive a voice uttered by the user as a natural language. According to another non-limiting example, the input unit 110 may be embodied as a keyboard, a touchscreen, or the like, to receive a natural language input by the user in the text format, instead of the voice format.

The communicator 120 may include various communication circuitry and perform communication with a plurality of external chatting servers. For example, the communicator 120 may transmit the natural language input through the input unit 110 to a chatting server. The communicator 120 may receive a response with respect to the natural language from the chatting server.

The processor 130 may include various processing circuitry and analyze a characteristic of the natural language. For example, the processor 130 may perform a pre-processing of the input natural language. The processor 130 may analyze a characteristic of the preprocessed natural language. Based on the characteristic of the natural language and the characteristic of the user, the processor 130 may determine the most suitable chatting server for processing the natural language among the plurality of chatting servers. For example, the processor 130 may determine a difficulty level of the natural language and determine a least resource consuming chatting server, among a plurality of chatting servers capable of processing the natural language at the determined difficulty level, as a chatting server corresponding to the natural language.

The processor 130 may change a chatting server corresponding to the natural language in real time. For example, in the case where a natural language at a low difficulty level is input and then a natural language at a high difficulty level is input, the processor 130 may re-determine a chatting server using a response model with a high processing performance as a chatting server corresponding to the natural language. When the chatting server is changed, the processor 130 may provide the contents of dialogues performed with the previous chatting server to a new chatting server. Through data synchronization, the processor 130 may easily change a chatting server.

The electronic apparatus 100 may provide a corresponding response depending on the contents of a query, emotion of the user, or the like. By differentiating specifications of chatting servers for providing various levels of responses, unnecessary use of resources may be reduced.

Figure 3:
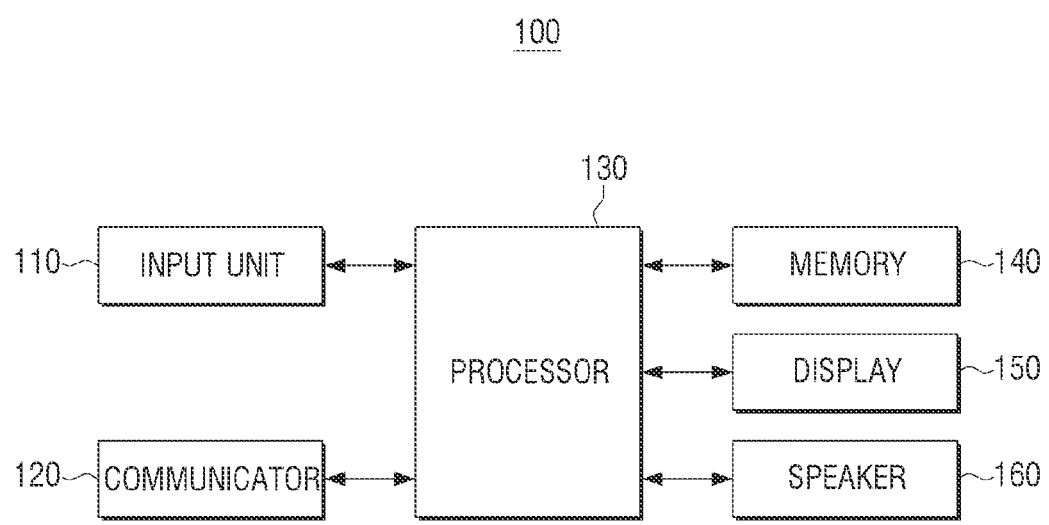
FIG. 3 is a block diagram illustrating an example of an electronic apparatus according to an embodiment of the present disclosure.

FIG. 3 is a block diagram illustrating an example of an electronic apparatus according to an embodiment of the present disclosure. Referring to FIG. 3, an electronic apparatus 100 may include an input unit (e.g., including input circuitry) 110, a communicator (e.g., including communication circuitry) 120, a processor (e.g., including processing circuitry) 130, a memory 140, a display 150 and a speaker 160.

The input unit 110 may include various input circuitry and receive voices, texts, or the like, from a user. For example, the input unit 110 may process voice signals received from the user. The input unit 110, in response to an analog form user voice being received, may perform sampling of the input user voice and covert the input user voice into digital signals. The input unit 110 may calculate (determine) energy of the digital signals and determine whether the energy of the digital signals is greater than a predetermined value. If the energy of the digital signals is greater than the predetermined value, the input unit 110 may remove noise components from the digital signals and transmit the digital signal from which the noise elements are removed to the processor 130. For example, the noise component may be the sudden noise that may occur in the surrounding environment.

The communicator 120 may include various communication circuitry and perform communication with the server 200 at an external source. The electronic apparatus 100 may directly perform, for example, and without limitation, voice recognition, matching score calculation, corresponding server determination, or the like, or request for the voice recognition, matching score calculation, corresponding server determination, or the like, to the server 200 by transmitting data to the server 200. For example, the communicator 120 may transmit a user voice input to the server 200 and receive a response corresponding to the user voice from the server 200.

To this end, the communicator 120 may include various communication modules comprising various communication circuitry such as, for example, and without limitation, a short-distance wireless communication module (not shown), a wireless communication module (not shown), or the like.

The short-distance wireless communication module may, for example, be a module including circuitry for performing communication with an external device located at a short distance in accordance with a short-distance wireless communication method such as Bluetooth, Zigbee or the like. The wireless communication module may, for example, be a module including circuitry that is connected to an external network and performs communication according to wireless communication protocols such as WiFi, WiFi direct, IEEE, and the like. In addition, the wireless communication module may further include a mobile communication module that is connected to a mobile communication network according to various mobile communication standards such as 3rd Generation (3G), 3rd Generation Partnership Project (3GPP), Long Term Evolution (LTE), LTE Advanced (LTE-A), or the like.

The memory 140 may store various modules, software and data for driving the electronic apparatus 100. For example, the memory 140 may store recognized voice information, history information of dialogues performed with a chatting server, context information with respect to a situation to which a natural language is input, user information, or the like. The user information may be collected by conducting a user satisfaction survey, etc. after a response is provided.

According to another embodiment, the memory 140 may store an Acoustic Model (AM) and a Language Model (LM) used for recognizing user voice. In addition, the memory 140 may store Corpus, which is a set of extracted language samples for processing a natural language.

The memory 140 may, for example, be a storage medium for storing various programs necessary for operating the electronic apparatus 100 and implemented in the form of a flash memory, a Hard Disk Drive (HDD), and/or a Solid State Drive (SSD). For example, the memory 140 may include a ROM for storing a program for performing an operation of the electronic apparatus 100 and a RAM for temporarily storing data according to an operation of the electronic apparatus 100.

The memory 140 may store programs and data for forming various screens to be displayed on the display 150. In addition, the memory 140 may store programs, applications and data for performing a specific service.

The display 150 and the speaker 160 may function as an output unit. According to the embodiment type of the electronic apparatus 100, at least one of the display 150 and the speaker 160 may be included. The electronic apparatus 100 may visually provide a response through the display 150 or audibly provide a response through the speaker 160.

The display 150 may display a response corresponding to the input natural language. In addition, the display 150 may display all the responses with respect to the input natural language.

The display 150 may be implemented, for example, and without limitation, as a liquid crystal display (LCD), an organic light emitting diode (OLED), a plasma display panel (PDP), or the like and display various available screens through the electronic apparatus 100.

The speaker 160 may output a voice. For example, the speaker 160 may output a response where a voice is converted into a voice signal. The speaker 160 may be mounted in the electronic apparatus 10 or may, for example, and without limitation, be embodied in the form of an output port such as a jack, or the like.

The processor 130 may include various processing circuitry and control the above-described configurations of the electronic apparatus 100. For example, the processor 130 may control the communicator 120 to transmit the natural language to the chatting server determined as the chatting server corresponding to the natural language, among the plurality of chatting servers.

The processor 130 may, for example, and without limitation, be implemented as a single CPU to perform a voice recognition operation, a language understanding operation, a matching score analysis operation and chatting server determination operation, may include a plurality of processors, or may, for example, and without limitation, be implemented as an Integrated Processor (IP) for performing a specific function. For example, the processor 130 may perform voice recognition based on a conventional Hidden Markov Model (HMM) or perform deep learning-based voice recognition such as a Deep Neural Network (DNN).

The processor 130 may preprocess the input natural language. The processor 130 may perform operations such as, for example, and without limitation, natural language cleansing, natural language separation, morphological analysis, entity extraction, or the like, as a pre-processing for processing the natural language. For example, the processor 130 may perform an operation of converting an input string to a morpheme string. The morpheme may, for example, be the smallest unit of meaning.

The processor 130 may analyze the preprocessed natural language. For example, the processor 130 may perform natural language analysis, dialogue pattern analysis, emotional analysis, user age/gender analysis, metadata analysis, and user log analysis, or the like. The processor 130 may represent each analysis result as a calculated matching score. Based on the calculated matching scores, the processor 130 may determine a corresponding chatting server.

In response to an additional natural language being input, the processor 130 may determine a corresponding chatting server through analysis of the additional natural language. If the chatting server corresponding to the additional natural language is different from the chatting server corresponding to the natural language previously processed, the processor 130 may transmit history information of dialogues performed with the chatting server corresponding to the natural language processed previously to the chatting server corresponding to the additional natural language. As described above, although a chatting server (or a chatting bot) is changed, the processor 130 may share the data, thereby preventing waste of resources while maintaining the consistency of the response.

The more detailed description of the operation of the processor 130 will be made below with reference to the illustrative drawings.

Figure 4:
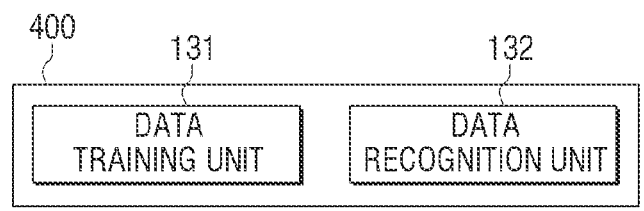
FIG. 4 is a block diagram illustrating an example processor according to some embodiments of the present disclosure.

FIG. 4 is a block diagram illustrating a processor (e.g., including processing circuitry and/or program elements) 400 according to some embodiments of the present disclosure. According to an embodiment, the processor 400 may include a data training unit (e.g., including processing circuitry and/or program elements) 131 and a data recognition unit (e.g., including processing circuitry and/or program elements) 132. The processor 400 may be the processor 130 of the electronic apparatus 100 or a processor of at least one of the plurality of chatting servers 210, 220 and 230 of the server 200.

The data training unit 131 may train the criteria for voice recognition, language understanding, text recognition and determination of a difficulty level of a natural language. The data recognition unit 132 may recognize contents of the input natural language based on the trained criteria. The processor 130 may determine to which chatting server a natural language may be transmitted based on the recognized contents. The processor 130 may analyze the input user voice itself, or convert the user voice into the text and analyze the text. The data training unit 131 may determine which data to use for recognizing the contents. The data training unit 131 may obtain the data used for training and apply the obtained data to data recognition models to be described below to train the criteria for voice recognition, language understanding and contents recognition.

The data training unit 131 may be included each of the plurality of chatting servers. The data training unit 131 included in each of the plurality of chatting servers may train the criteria for providing a response by recognizing the natural language input by the user. The data training unit 131 included in each of the plurality of chatting servers may store a data recognition model, which is generated or refined as a result of training, in each of the plurality of chatting servers. For example, the plurality of chatting servers may include a beginner level model trained for generating a response to a specific natural language, an intermediate level model for understanding a context and an advanced level model for understanding languages by inference. Each data training unit 131 may store the generated or refined data recognition model in an additional data base server.

The data training unit 131 may obtain data to be used for training and train a data recognition model according to a training method or non-training method.

For example, the plurality of chatting servers may be classified according to a dialogue difficulty level (e.g. a beginner level, an intermediate level and an advanced level) or a dialogue style. The plurality of chatting servers may be classified according to user opinion (e.g. very positive, positive, neutral, negative and very negative). Alternatively, or additionally, the plurality of chatting servers may be classified according to user emotion (e.g. calmness, joy, anger, sadness, depression, surprise and fear). The plurality of chatting servers may be classified according to age, gender, region and education, or the like, of the user.

In the case where the plurality of chatting servers are classified according to the above criteria, different data for training used in the data training unit 131 may be included in each of the plurality of chatting servers.

For example, in the case where the plurality of chatting servers are classified according to the dialogue difficulty level or the dialogue style, the data training unit 131 included in a first chatting server among the plurality of chatting servers may use {formal language, response to natural language} entity as a training purpose data. The data training unit 131 included in a second chatting server among the plurality of chatting servers may use {informal natural language, response to natural language} entity as the training purpose data. In addition, the data training unit 131 included in a third chatting server among the plurality of chatting servers may use {informal term/slang natural language, response to natural language} entity as the training purpose data.

According to another embodiment, in the case where the plurality of chatting servers are classified according to the user opinion, the data training unit 131 included in each of the plurality of chatting servers may user each of {very positive natural language, response to natural language} entity, {positive natural language, response to natural language} entity, {neutral natural language, response to natural language} entity, {negative natural language, response to natural language} entity and {very negative natural language, response to natural language} as the training purpose data.

According to another embodiment, in the case where the plurality of chatting servers are classified according to the user emotion, the data training unit 131 included in each of the plurality of chatting servers may use each of {normalized natural language, response to natural language} entity, {joyful language, response to natural language} entity, {angry natural language, response to natural language} entity, {grieving natural language, response to natural language} entity, {depressed natural language, response to natural language} entity and {fearful natural language, response to natural language} entity as the training purpose data.

According to another embodiment, in the case where the plurality of chatting servers are classified according to the user age, the data training unit 131 included in each of the plurality of chatting servers may use each of {natural language input by boy, response to natural language} entity, {natural language input by young man, response to natural language} entity, {natural language input by middle age, response to natural language} entity and {natural language input by old age, response to natural language} entity as the training purpose data.

According to another embodiment, in the case where the plurality of chatting servers are classified according to the region of the user, the data training unit 131 included in each of the plurality of chatting servers may use {natural language input by person in Seoul, response to natural language} entity, {natural language input by person in Gyeongsang-do, response to natural language and} entity, {natural language input by person in Jeolla-do, response to natural language} entity and {natural language input by Chungcheong-do, response to natural language} as the training purpose data.

The data recognition unit 132 may recognize a situation from predetermined data using the trained data recognition model. The data recognition unit 132 may obtain the predetermined data according to predetermined criteria by training and use the data recognition model using the obtained data as an input value. For example, using the trained acoustic model and language model, the data recognition unit 132 may recognize the input natural language. In addition, using the data obtained by recognizing the natural language as an input value, the data recognition unit 132 may refine a data recognition model. The data recognition unit 132 may use Big Data and user input data for natural language recognition and natural language analysis.

The data recognition unit 132 may be included in each of the plurality of chatting servers. The data recognition unit 132 included in each of the plurality of chatting servers may provide a recognition result with respect to recognition purpose data using the data recognition model for providing a response with respect to the natural language.

In response to the processor 130 of the server 200 or the processor 130 of the electronic apparatus 100 analyzing the natural language input by the user and determining a chatting server to transmit the natural language, the natural language input by the user or a natural language into which the natural language input by the user is preprocessed may be transmitted to the determined chatting server.

The data recognition unit 132 included in each of the plurality of chatting servers may apply the natural language input by the user or the preprocessed natural language to the data recognition model as an input value, and obtain (or estimate, infer, or predict) the response with respect to the natural language as a recognition result. The chatting server may transmit the response with respect to the natural language obtained by the data recognition unit 132 to the electronic apparatus 100.

At least one of the data training unit 131 and the data recognition unit 132 may be manufactured, for example, and without limitation, in the form of one or a plurality of hardware chips and mounted in the electronic apparatus 100. For example, and without limitation, at least one of the data training unit 131 and the data recognition unit 132 may be manufactured in the form of a hardware chip for Artificial Intelligence (AI) only, or manufactured as a part of an existing generic processor (e.g. a CPU or an application processor) or an IP for a specific function to be mounted on the electronic apparatus 100 in a variety of types. The hardware chip for Artificial Intelligence (AI) may, for example, be a processor specialized in probability computation having a higher parallel processing performance than the conventional generic processor, thereby quickly performing an arithmetic operation in the artificial intelligence field such as machine learning.

FIG. 4 illustrates both the data training unit 131 and the data recognition unit 132 mounted on the electronic apparatus 100, but the data training unit 131 and the data recognition unit 132 each may be mounted on a separate device. For example, one of the data training unit 131 and the data recognition unit 132 may be included in the electronic apparatus 100, and the other one may be included in the server. In addition, the data training unit 131 and the data recognition unit 132 may be connected to each other by wire or wireless, the model information constructed by the data training unit 131 may be provided to the data recognition unit 132, or the data input to the data recognition unit 132 may be provided to the data training unit 131 as additional training data.

At least one of the data training unit 131 and the data recognition unit 132 may be embodied as a software module including various program elements. In the case where at least one of the data training unit 131 and the data recognition unit 132 is embodied as a software module (or, a program module including instructions), the software module may be stored in a non-transitory computer readable recoding medium. At least one software module may be provided by an Operation System (OS) or a predetermined application. Alternatively, or additionally, part of at least one software module may be provided by the operation system and the remaining of the software module may be provided by the predetermined application.

Figure 5A:
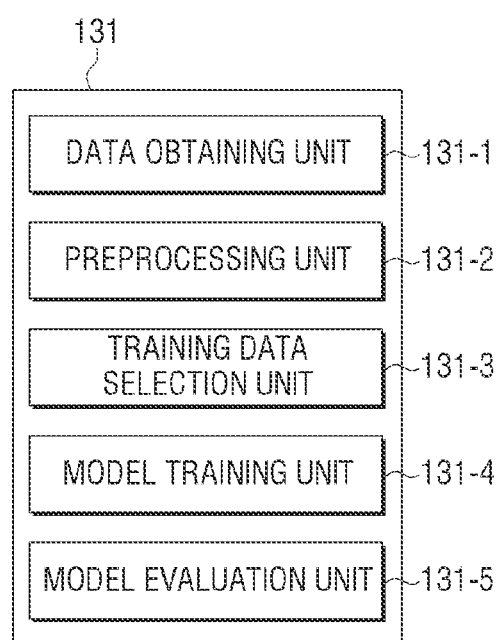
FIG. 5A is a block diagram illustrating an example data training unit according to some embodiments of the present disclosure.

FIG. 5A is a block diagram illustrating an example data training unit according to some embodiments of the present disclosure. Referring to FIG. 5A, the data training unit 131 of FIG. 4 according to some embodiments may include a data acquisition unit (e.g., including processing circuitry and/or program elements) 131-1, a preprocessing unit (e.g., including processing circuitry and/or program elements) 131-2, a training data selection unit (e.g., including processing circuitry and/or program elements) 131-3, a model training unit (e.g., including processing circuitry and/or program elements) 131-4 and a model evaluation unit (e.g., including processing circuitry and/or program elements) 131-5. The data training unit 131 according to some embodiments may include the data acquisition unit 131-1 and the model training unit 131-4 and further selectively include the preprocessing unit 131-2, the training data selection unit 131-3 and the model evaluation unit 131-5, or may not include the preprocessing unit 131-2, the training data selection unit 131-3 and the model evaluation unit 131-5.

The data acquisition unit 131-1 may obtain data necessary for situation determination. The data acquisition unit 131-1 may obtain a natural language from the input unit 110. For example, the data acquisition unit 131-1 may obtain voice data where a user voice signal input through a microphone is converted into a digital signal. The data acquisition unit 131-1 may receive the training purpose data from a server or a network such as Internet through the communicator 120. For example, the data acquisition unit 131-1 may receive natural languages at different levels as training purpose data.

The preprocessing unit 131-2 may preprocess the obtained data so that the obtained data may be used for training the situation determination. The preprocessing unit 131-2 may process the obtained data in a predetermined format so that the model training unit 131-4 to be described below may use the obtained data for training the situation determination. For example, the preprocessing unit 131-2 may perform morphological analysis, natural language separation, and entity extraction on the obtained natural language. Alternatively, in the case where the natural language is voice data, the preprocessing unit 131-2 may convert the voice data into text data. The preprocessing unit 131-2 may perform morphological analysis, natural language separation, and entity extraction on the text data.

The training data selection unit 131-3 may select data necessary for training from the preprocessed data. The selected data may be provided to the model training unit 131-4. The training data selection unit 131-3 may select the data necessary for training from the preprocessed data according to the predetermined criteria for the situation determination. The training data selection unit 131-3 may select data based on the predetermined criteria by training by the model training unit 131-4 to be described below. The predetermined criteria may include, for example, at least one of attributes of data, a generation time of data, a creator of data, a reliability of data, an object of data, a generation area of data, and a size of data.

According to another embodiment, in the early stage of training, the training data selection unit 131-3 may remove natural language data having high similarity among the natural language data. In other words, for the early training, the training data selection unit 131-3 may select natural language data having low similarity to train criteria easy to distinguish.

The training data selection unit 131-3 may select natural language data which commonly satisfy one of the predetermined criteria by training. The model training unit 131-4 may train different criteria from the already trained criteria.

The model training unit 131-4 may train criteria for recognizing a natural language based on training data. The model training unit 131-4 may a training criterion about which training data may have to be used for natural language analysis.

The training data selection unit 131-3 may select a natural language which satisfies a training criterion from a plurality of training purpose data. For example, in the case where a device where the training data selection unit 131-3 operates is a chatting server, the training data selection unit 131-3 may select a natural language suitable for the purpose of the chatting server and an entity including the response with respect to the natural language. Specifically, in the case where the chatting server has a purpose of providing a response with respect to a formal natural language, the training data selection unit 131-3 may select the formal natural language from the plurality of training purpose data and an entity including a response with respect to the formal natural language.

The model training unit 131-4 may train the data recognition model used for the situation determination based on the training data. In this case, the data recognition model may be a pre-built model. For example, the data recognition model may be a pre-built model that receives basic training data (e.g., sample audio data). According to another embodiment, the data recognition model may be a pre-built text analysis model using Big Data.

The data recognition model may be configured in consideration of the application field of a recognition model, the purpose of training, or the computer performance of a device. The data recognition model may be, for example, a model based on a neural network. The data recognition model may be designed to simulate the human brain structure on a computer. The data recognition model may include a plurality of weighted network nodes that simulate neurons of a human neural network. A plurality of network nodes may each establish a connection relationship to simulate a synaptic activity of neurons sending and receiving signals via synapses. The data recognition model may include, for example, a neural network model or a deep-learning model developed from the neural network model. In the deep-learning model, a plurality of network nodes may be located at different depths (or layers), and exchange data according to a convolution connection relationship. For example, models such as Deep Neural Network (DNN), Recurrent Neural Network (RNN), and Bidirectional Recurrent Deep Neural Network (BRDNN) may be used as a data recognition model, but the present disclosure is not limited thereto.

According to various embodiments, when there are a plurality of pre-built data recognition models, the model training unit 131-4 mat determine a data recognition model having a large relation between the input training data and the basic training data. In this case, the basic training data may be pre-classified according to the data type, and the data recognition model may be pre-built for each data type. For example, the basic training data may be pre-classified by various criteria such as an area where the training data is generated, a time at which the training data is generated, a size of the training data, a genre of the training data, a creator of the training data, types of objects in the training data, and the like.

The model training unit 131-4 may also train a data recognition model using a training algorithm including, for example, an error back-propagation method or a gradient descent method.

For example, the model training unit 131-4 may train a data recognition model through supervised training using the training data as an input value. According to another embodiment, the model training unit 131-4 may train a data recognition model through unsupervised training, which finds a criterion for determining a situation by training the types of data necessary for the situation determination without further guidance. According to another embodiment, the model training unit 131-4 may train a data recognition model through reinforcement training using feedback on whether the result of the situation determination based on the training is correct.

In the case where the model training unit 131-4 is included in each of the plurality of chatting servers, the model training unit 131-4 may train a data recognition model using different training purpose data according to the purpose of each of the plurality of chatting servers. Various embodiments of the training purpose may correspond to the examples of the data training unit 131 of FIG. 4 using the various training purpose data and thus, the description will not be repeated here.

In response to the data recognition model being trained, the model training unit 131-4 may store the trained data recognition model. The model training unit 131-4 may store the trained data recognition model in the memory 140 of the electronic apparatus 100. The model training unit 131-4 may store the trained data recognition model in a memory of the server 200 connected to the electronic apparatus 100 by wire or wireless network. The model training unit 131-4 may store the trained data recognition model in an additional data base server.

The memory 140 that stores the trained data recognition model may store a command or data related to at least one of other configurations of the electronic apparatus 100. The memory 140 may store a software and/or a program. For example, the program may include a kernel, a middleware, an application programming interface (API) and/or an application program (or "application"), or the like.

The model evaluation unit 131-5 may input evaluation data to a data recognition model and if a recognition result output from the evaluation data does not satisfy a predetermined criterion, allow the model training unit 131-4 to train again. The evaluation data may be predetermined data for evaluating the data recognition model.

For example, the model evaluation unit 131-5, if the number or ratio of the evaluation data of which recognition result is not exact is greater than a predetermined threshold value, among recognition results of the trained data recognition model with respect to the evaluation data, may determine that the case does not satisfy the predetermined criterion. For example, if the predetermined criterion is determined as a ratio 2%, when the trained data recognition model outputs an incorrect recognition result with respect to evaluation data which exceeds 20 out of the total number of 1000 evaluation data, the model evaluation unit 131-5 may evaluate that the trained data recognition model is inappropriate.

In the case where there are a plurality of trained data recognition models, the model evaluation unit 131-5 may evaluate whether each trained data recognition model satisfies a predetermined criterion and determine a trained data recognition model that satisfies the predetermined criterion as a final data recognition model. In the case where there are a plurality of trained data recognition models that satisfy the predetermined criterion, the model evaluation model 131-5 may determine any one or the predetermined number of data recognition models as a final data recognition model in order of highest score.

At least one of the data acquisition unit 131-1, the preprocessing unit 131-2, the training data selection unit 131-3, the model training unit 131-4 and the model evaluation unit 131-5 in the data training unit 131 may, for example, and without limitation, be manufactured in the form of at least one hardware chip including various circuitry and mounted on the electronic apparatus. For example, at least one of the data acquisition unit 131-1, the preprocessing unit 131-2, the training data selection unit 131-3, the model training unit 131-4 and the model evaluation unit 131-5 may be made in the form of a hardware chip for Artificial Intelligence (AI) only, or may be fabricated as part of an existing generic processor (e.g., a CPU or an application processor) or an IP for a particular function to be mounted on the electronic apparatus 100 in a variety of types.

The data acquisition unit 131-1, the preprocessing unit 131-2, the training data selection unit 131-3, the model training unit 131-4, and the model evaluation unit 131-5 may be mounted on a single electronic apparatus, or each may be mounted on a separate electronic apparatus. For example, part of the data acquisition unit 131-1, the preprocessing unit 131-2, the training data selection unit 131-3, the model training unit 131-4 and the model evaluation unit 131-5 may be included in the electronic apparatus 100, and the remaining may be included in the server 200.

At least one of the data acquisition unit 131-1, the preprocessing unit 131-2, the training data selection unit 131-3, the model training unit 131-4 and the model evaluation unit 131-5 may, for example, and without limitation, be implemented with a software module including various program elements. In the case where at least one of the data acquisition unit 131-1, the preprocessing unit 131-2, the training data selection unit 131-3, the model training unit 131-4, and the model evaluation unit 131-5 is embodied with a software module (or, a program module including instructions), the software module may be stored on a non-transitory computer-readable recording medium. At least one software module may be provided by an Operating System (OS) or by a predetermined application. Alternatively, or additionally, part of the at least one software module may be provided by the OS and part of the remaining may be provided by the predetermined application.

Figure 5B:
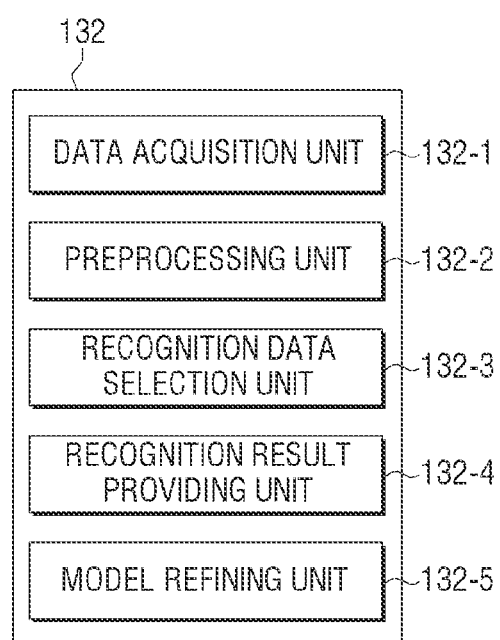
FIG. 5B is a block diagram illustrating an example data recognition unit according to some embodiments of the present disclosure.

FIG. 5B is a block diagram illustrating a data recognition unit 132 according to some embodiments of the present disclosure. Referring to FIG. 5B, the data recognition unit 132 of FIG. 4 according to some embodiments may include a data acquisition unit (e.g., including processing circuitry and/or program elements) 132-1, a preprocessing unit (e.g., including processing circuitry and/or program elements) 132-2, a recognition data selection unit (e.g., including processing circuitry and/or program elements) 132-3, a recognition result providing unit (e.g., including processing circuitry and/or program elements) 132-4 and a model refining unit 132-5. The data recognition unit 132 according to some embodiments may necessarily include the data acquisition unit 132-1 and the recognition result providing unit 132-4 and selectively include the preprocessing unit 132-2, the recognition data selection unit 132-3 and the model refining unit 132-5.

The data acquisition unit 132-1 may obtain data necessary for the situation determination, and the preprocessing unit 132-2 may preprocess the obtained data so that the obtained data may be used for the situation determination. The preprocessing unit 132-2 may process the obtained data into a predetermined format so that the recognition result providing unit 132-4, which will be described below, may use the obtained data for the situation determination. For example, in the case where the obtained data is natural language data, the preprocessing unit 132-2 may perform morphological analysis, natural language separation and entity extraction on the natural language data. In the case where the natural language data is audio data, the preprocessing unit 132-2 may convert the audio data into text data. The preprocessing unit 132-2 may perform morphology analysis, natural language separation and entity extraction on the text data.

The recognition data selection unit 132-3 may select data necessary for the situation determination from the preprocessed data. The selected data may be provided to the recognition result providing unit 132-4. The recognition data selection unit 132-3 may select some or all of the preprocessed data according to a predetermined criterion for the situation determination. The recognition data selection unit 132-3 may select data according to a predetermined criterion by training by the model training unit 131-4. The predetermined criterion may include, for example, at least one of attributes of data, a generation time of data, a creator of data, a reliability of data, an object of data, a generation area of data, and a size of data.

The recognition result providing unit 132-4 may determine a situation by applying the selected data to the data recognition model. The recognition result providing unit 132-4 may provide the recognition result according to the data recognition purpose. The recognition result providing unit 132-4 may apply the selected data to the data recognition model using the data selected by the recognition data selecting unit 132-3 as an input value. In addition, the recognition result may be determined by the data recognition model.

For example, the recognition result providing unit 132-4 may recognize the natural language input by the user according to criteria determined by the data recognition model. Using the data recognition model, the recognition result providing unit 132-4 may recognize contents of the natural language and determine a processing difficulty level.

The recognition result providing unit 132-4 may apply the input natural language or the preprocessed natural language to the data recognition model as an input value and obtain a response with respect to the natural language as a recognition result.

The model refining unit 132-5 may refine the data recognition model based on the evaluation of the recognition result provided by the recognition result providing unit 132-4. For example, the model refining unit 132-5 may allow the model training unit 131-4 to refine the data recognition model by providing the recognition result provided by the recognition result providing unit 132-4 to the model training unit 131-4.

At least one of the data acquisition unit 132-1, the preprocessing unit 132-2, the recognition data selection unit 132-3, the recognition result providing unit 132-4, and the model refining unit 132-5 included in the data recognition unit 132 may, for example, and without limitation, be manufactured in the form of at least one hardware chip including various circuitry and mounted on the electronic apparatus. For example, at least one of the data acquisition unit 132-1, the preprocessing unit 132-2, the recognition data selection unit 132-3, the recognition result providing unit 132-4, and the model refining unit 132-5 may be made in the form of a hardware chip for Artificial Intelligence (AI) only, or may be fabricated as part of an existing generic processor (e.g., a CPU or an application processor) or an IP for a particular function to be mounted on the electronic devices 100 in a variety of types.

The data acquisition unit 132-1, the preprocessing unit 132-2, the recognition data selection unit 132-3, the recognition result providing unit 132-4, and the model refining unit 132-5 may be mounted on a single electronic device, or each may be mounted on a separate electronic apparatus. For example, part of the data acquisition unit 132-1, the preprocessing unit 132-2, the recognition data selection unit 132-3, the recognition result providing unit 132-4, and the model refining unit 132-5 may be included in the electronic apparatus 100 and some of which may be included in server 200.

At least one of the data acquisition unit 132-1, the preprocessing unit 132-2, the recognition data selection unit 132-3, the recognition result providing unit 132-4, and the model refining unit 132-5 may be implemented with a software module including various program elements. In the case where at least one of the data acquisition unit 132-1, the preprocessing unit 132-2, the recognition data selection unit 132-3, the recognition result providing unit 132-4, and the model refining unit 132-5 is implemented with a software module (or a program module including instructions), the software module may be stored on a non-transitory computer readable recording medium. At least one software module may be provided by an Operating System (OS) or by a predetermined application. Alternatively, or additionally, some of at least one software module may be provided by the OS and some of the remaining may be provided by the predetermined application.

According to an embodiment of the present disclosure, the processor 130 may determine a difficulty level of the natural language input by the user using a plurality of analysis methods. For example, the processor 130 may calculate a matching score based on each of the analysis methods. The matching score may be a possibility value which indicates a degree of match with each chatting server. Based on a final matching score obtained by summing the calculated scores, the processor 130 may determine a chatting server corresponding to the natural language among a plurality of chatting servers.

The plurality of chatting servers may include first to third chatting servers that provide a response with respect to the natural language according to a characteristic of the natural language input by the user and a characteristic of the user. The first to third chatting servers may be classified based on a method for providing a response. In addition, according to a resource required for each response providing method, the first to third chatting servers may include different specifications such as CPU, memory, or the like.

For example, a first chatting server 210 may provide a response corresponding to the natural language input by the user based on pre-stored response data base. A second chatting server 220 may use a first response model for providing a response by determining a context of the natural language input by the user. A third chatting server 230 may use a second response model for providing a response by inferring a question included in the natural language input by the user.

FIG. 6 is a table illustrating an example method for determining a difficulty level of a natural language according to an embodiment of the present disclosure. As illustrated in FIG. 6, a plurality of chatting bots (or chatting servers) may include a plurality of chatting bots with different response providing methods and resources (e.g. a chatting bot A, a chatting bot B, a chatting bot C, . . . , and a chatting bot N).

Referring to FIG. 6, the processor 130 may calculate (determine) a matching score (or a probability score) for each chatting bot (or a chatting server) based on each analysis method. Each matching score may be calculated to have a value between 0 and 1 through normalization. The processor 130 may determine a chatting bot to be used for generating a response based on a final matching obtained by summing matching scores. In FIG. 6, a sine final matching score value of the chatting bot C is the largest, the processor 130 may select the chatting bot C as a chatting bot corresponding to the natural language. According to various embodiments, the processor 130 may determine a chatting bot based on a final matching score, which is a sum of at least one matching score among a plurality of matching scores.

If there are a plurality of chatting bots having the same final matching score, the processor 130 may determine a chatting bot corresponding to the natural language based on the performance of a chatting bot. For example, the processor 130 may determine a least resource consuming chatting bot, among the plurality of chatting bots having the same final matching score, as a chatting bot corresponding to the natural language.

Hereinafter, various methods for determining a difficulty level of a natural language input by a user will be described in greater detail.

Figure 7B:
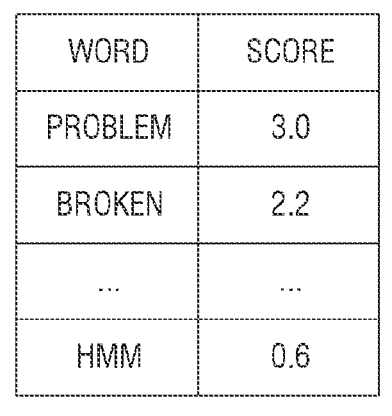

FIGS. 7A and 7B are tables illustrating an example method for calculating matching scores by analyzing a natural language according to an embodiment of the present disclosure. The processor 130 may, for example, and without limitation, calculate a matching score based on a weight values given to words of a natural language and a Term Frequency/Inverse Document Frequency (TF/IDF) value.

FIG. 7A is a table illustrating an example of giving a weight value to each word. The processor 130 may give a low weight value to a generic word and a high weight value to a proper noun such as a product a user inquires about. For example, the processor 130 may give low weight values to words such as 'goodbye', 'inquiry', 'question' and the like. The processor 130 may give high weight values to words such as 'cable', 'liquid crystal', 'screen' and the like.

FIG. 7B is a table illustrating an example of a value obtained by calculating Term Frequency/Inverse Document Frequency (TF/IDF) values of words in each sentence. The TF/IDF value may be statistical figures indicating how important a specific word is in a specific document. For example, the processor 130 may extract key words of the document through the TF/IDF value.

The TF value may, for example, be a value indicating how frequently a specific word appears in a sentence. The DF value may, for example, be a value indicating how frequently a specific word itself appears in a document. As TF value becomes higher and the DF value becomes lower, the specific word may be determined as an important word, the TF/IDF value may be obtained by multiplying the TF value by an IDF value, which is a reciprocal of the DF value.

FIG. 8 is a table illustrating an example method for calculating matching scores by analyzing a dialogue pattern according to an embodiment of the present disclosure. Referring to FIG. 8, chatting servers are classified according to a dialogue difficulty level (a beginner level, an intermediate level and an advanced level). The processor 130 may calculate similarity to the natural language input by the user using dialogue pattern data processed in the beginner level, intermediate level and advanced level chatting servers. For example, the processor 130 may calculate a matching score through cosine similarity score calculation. The cosine similarity score may be calculated by the following Equation 1:

$$S_c = sim(A, B) = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$ [Equation 1]

According to an embodiment, the processor 130 may calculate a matching score through emotion analysis. The processor 130 may calculate a matching score with respect to each chatting server through sentiment analysis and emotion analysis.

The sentiment analysis may be a method for classifying a natural language into five steps of very positive, positive, neutral, negative and very negative and calculating a matching score with respect to each chatting server. The emotion analysis may be a method for classifying a natural language into seven types of emotion of calmness, joy, anger, sadness, depression, surprise, fear and calculating a matching score with respect to each chatting server.

The processor 130 may merge the results of the sentiment analysis and the emotion analysis and perform normalization of the result to have a value between 0 and 1.

According to an embodiment of the present disclosure, the processor 130 may calculate a matching score through user analysis. The processor 130 may establish a user analysis model based on age, gender, region, education, etc. of the user who uses the existing chatting server. The processor 130 may calculate a matching score based on the established user analysis model. The machine learning method that uses artificial intelligence technology such as a deep-learning method may be used for establishing a user analysis model and determining a user analysis reference.

According to an embodiment of the present disclosure, the processor 130 may calculate a matching score through metadata analysis. The processor 130 may establish a metadata analysis model using registration information, classification contents of the product the user inquires about. The processor 130 may calculate a matching score based on the established metadata analysis model.

According to an embodiment of the present disclosure, the processor 130 may calculate a matching score through log analysis. The processor 130 may determine a frequency of use of each chatting server based on the previous log record of the user. The processor 130 may predict which chatting server to use and calculate a matching score.

As described above, the processor 130 may calculate a matching score with respect to each chatting sever based on various criteria. The criteria is not limited to these 6 (six). Considering the characteristic of the natural language input by the user and the availability of user information, the processor 130 may use part of the various criteria.

The processor 130 may calculate a final matching score by summing the calculated matching scores. The processor 130 may determine a chatting server having a highest final matching score as a chatting server that generates a response corresponding to the natural language.

After a chatting server is determined with the input natural language, an additional natural language may be input through the input unit 110 from the user. The processor 130 may determine a chatting server to generate a response with respect to the additional natural language through the same matching score calculation.

In response that the chatting server to generate the response is the same as a predetermined chatting server, a chatting server (or a chatting bot) may not need to be changed, so that there will be no problem. However, in response that a chatting server corresponding to the existing natural language is different from the chatting server corresponding to the additional natural language, due to the change of the chatting server, the dialogue context with the user may not be continued. Therefore, it is desirable that the processor 130 may prevent the user from recognizing that the chatting server is changed.

According to an embodiment of the present disclosure, the processor 130 may synchronize history information of dialogues performed with the existing chatting server and context information with a new chatting server in the case where the chatting server is changed. In other words, the processor 130 may transmit the history information of dialogues performed with the existing chatting server and the context information along with the additionally input natural language to the new chatting server.

Figure 9:
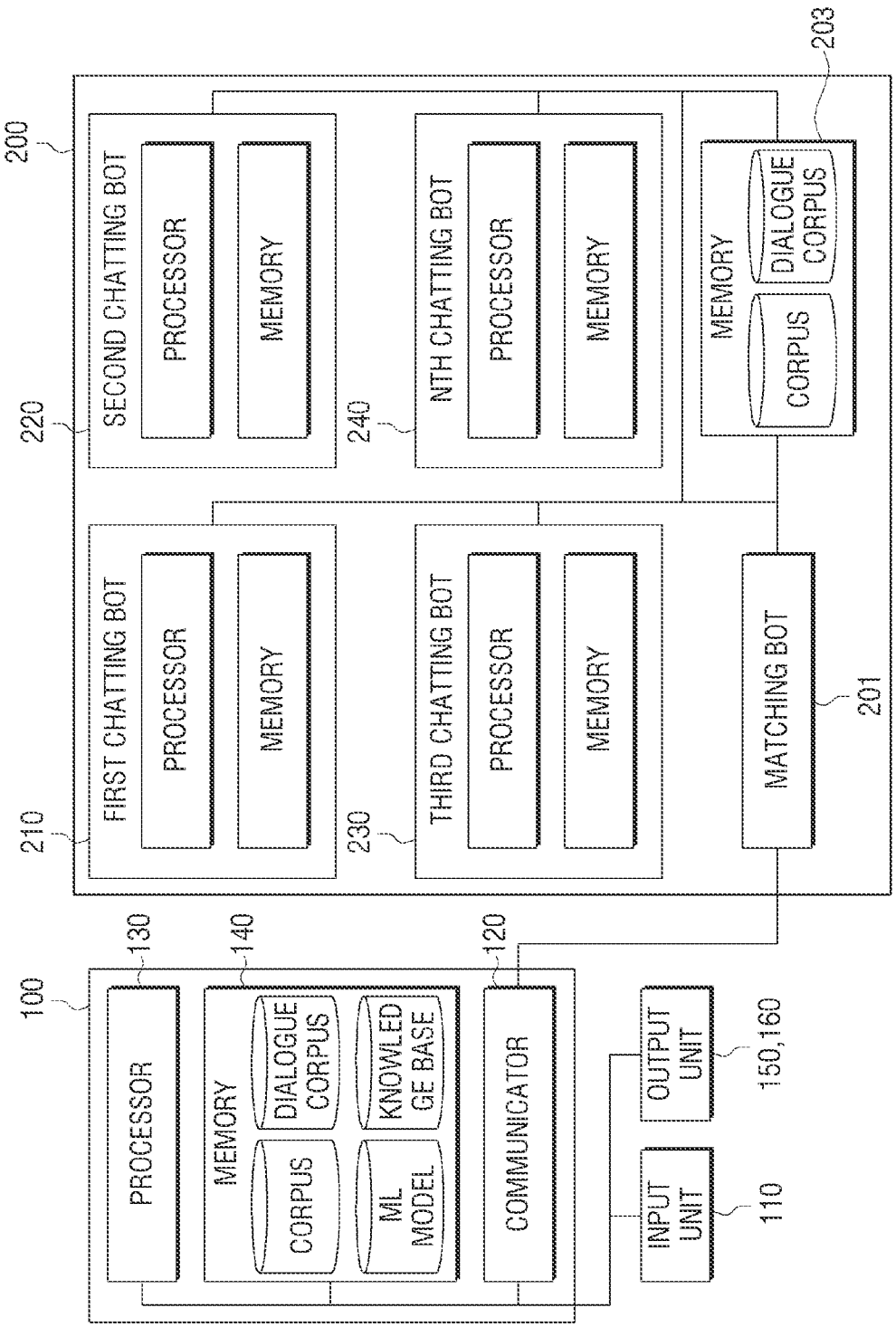
FIG. 9 is a block diagram illustrating an example configuration of a chatting bot system according to another embodiment of the present disclosure.

FIG. 9 is a block diagram illustrating an example configuration of a chatting bot system according to another embodiment of the present disclosure. Referring to FIG. 9, the server 200 may include the plurality of chatting bots 210, 220, 230 and 240 and a matching bot 201 that matches one of the plurality of chatting bots with the input natural language. The electronic apparatus 100 may receive the natural language from the user and function as an input/output device outputting a response. The electronic apparatus 100 may perform preprocessing and converting voice data to text data via voice recognition.

The server 200 may include a storage 203 storing dialogue history information and context information to realize synchronization of information between the plurality of chatting bots 210, 220, 230 and 240.

According to various embodiments, the matching bot 201 may determine a chatting bot matched with the natural language input by the user among the plurality of chatting bots 210, 220, 230 and 240 based on the trained data recognition model. The data recognition model the matching bot 201 uses may be a rule-based model or an artificial intelligence model which is trained using neural network algorithms such as Deep Neural Network (DNN), Recurrent Neural Network (RNN), and Bidirectional Recurrent Deep Neural Network (BRDNN).

The matching bot 201 may train a base data recognition model and generate or refine a data recognition model that is set to determine a chatting bot matched with the natural language input by the user. The matching bot 201 may apply the natural language input by the user to the data recognition model and provide identification information of the chatting bot matched with the natural language input by the user as a recognition result. To this end, the matching bot 201 may include at least one of the data training unit 131 and the data recognition unit 132 described in FIGS. 4, 5A and 5B. In this case, the data training unit 131 of the matching bot 201 may generate or refine a data recognition model for determining a chatting bot using {natural language, identification information of a chatting server matched with natural language} entity as training purpose data. The data recognition unit 131 of the matching bot 201 may apply the natural language input by the user as an input value of a data recognition model for determining a chatting bot and obtain the identification information of the chatting bot matched with the natural language input by the user as a recognition result.

FIG. 9 illustrates that the matching bot 201 is included in the server 200, but depending on an implement method, the matching bot 201 may be included in an additional server or device, or included in the electronic apparatus 100 of the present disclosure.

Figure 10:
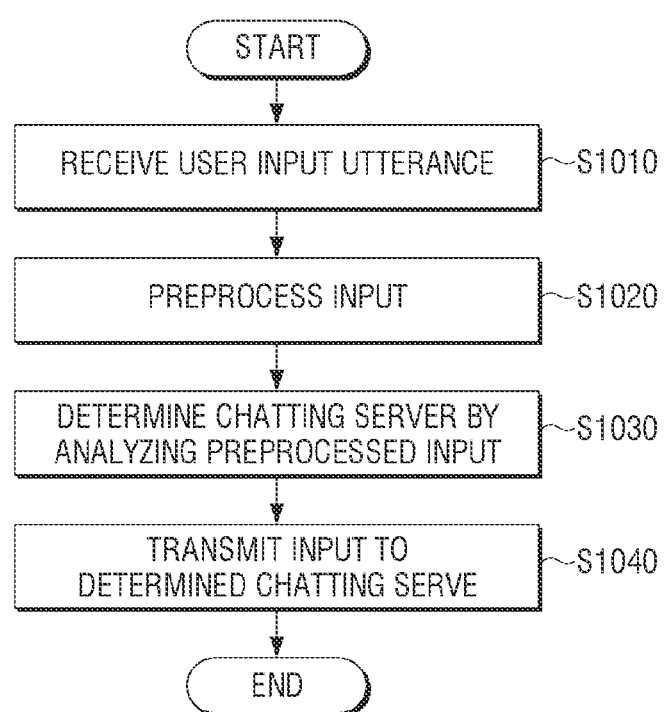
FIGS. 10 and 11 are flowcharts illustrating an example method for controlling an electronic apparatus according to various embodiments of the present disclosure.

FIG. 10 is a flowchart illustrating an example method for controlling an electronic apparatus according to various embodiments of the present disclosure. Referring to FIG. 10, the electronic apparatus 100 may receive a natural language input by a user at step S1010. The electronic apparatus 100 may perform preprocessing of the natural language input by the user at step S1020.

The electronic apparatus 100 may analyze the preprocessed natural language and determine a chatting server for generating a response with respect to the input natural language at step S1030. For example, the electronic apparatus 100 may analyze a characteristic of the preprocessed natural language and a characteristic of the user and determine a chatting server corresponding to the input natural language among a plurality of chatting servers.

For example, the plurality of chatting servers may include a first chatting server, a second chatting server and a third chatting server that provide a response with respect to the natural language input by the user according to the characteristic of the natural language input by the user and the characteristic of the user. However, the chatting server types are not limited to 3 (three), but the chatting server type may be added in case where the response model types using different resources for providing a response are segmented.

For example, the first chatting server may be a chatting server that provides the response corresponding to the natural language input by the user using pre-stored response data base. Such the chatting server may be the simplest response model having a lowest level specification among the plurality of chatting servers. The second chatting server may be a server that provides a response by determining a context of the natural language input by the user using a first response model and the third chatting server may be a chatting server that provides a response by inferring a question included in the natural language input by the user using a second response model.

The electronic apparatus 100 may calculate matching scores with respect to criteria to determine one of the plurality of chatting servers. For example, with respect to each of the plurality of chatting servers, the electronic apparatus 100 may calculate a first matching score with respect to the natural language, a second matching score with respect to a dialogue pattern including the natural language, a third matching score with respect to emotion of the user and a fourth matching score with respect to a characteristic of the user. The electronic apparatus 100 may calculate a final matching score by adding the first to fourth matching scores with respect to the plurality of chatting servers.

For example, the electronic apparatus 100 may calculate a first matching score based on weighted values given to words included in the natural language and a Term Frequency/Inverse Document Frequency (TF/IDF) value. In addition, the electronic apparatus 100 may calculate a second matching score based on similarity to pre-stored dialogue pattern data. In addition, the electronic apparatus 100 may calculate a third matching score based on sentiment analysis and emotion analysis on the natural language and a fourth matching score based on at least one of age, gender, region and education of the user.

The electronic apparatus 100 may determine a chatting server having a highest matching score of the plurality of chatting servers as the chatting server corresponding to the natural language. The electronic apparatus 100 may transmit the natural language to the determined chatting server at step S1040. In response to the response being received from the chatting server, the electronic apparatus 100 may output the response to the user.

According to various embodiments, the electronic apparatus 100 may be coupled to a chatting server through short-distance communication or long-distance communication. Connecting the electronic apparatus 100 and a chatting server to each other may indicate that the electronic apparatus 100 and the chatting server are directly connected to each other, or coupled to each other via an additional element (e.g. at least one of third elements such as an access point (AP), a hub, a transmission device, a base station, a router, a gateway, or the like).

An interface for transmitting/receiving data between the electronic apparatus 100 and a chatting server may be defined. For example, an Application Program Interface (API) having training purpose data or recognition purpose data to be applied to a data recognition model of a chatting server as a factor value (or an intermediate value or a transfer value) may be defined. The API is may be defined as a set of subroutines or functions that is called for a processing of any one protocol (e.g., a protocol defined in the electronic apparatus 100) to another protocol (e.g., a protocol defined in a chatting server). In other words, the operation of another protocol may be performed in any one of the protocols through the API.

Figure 11:
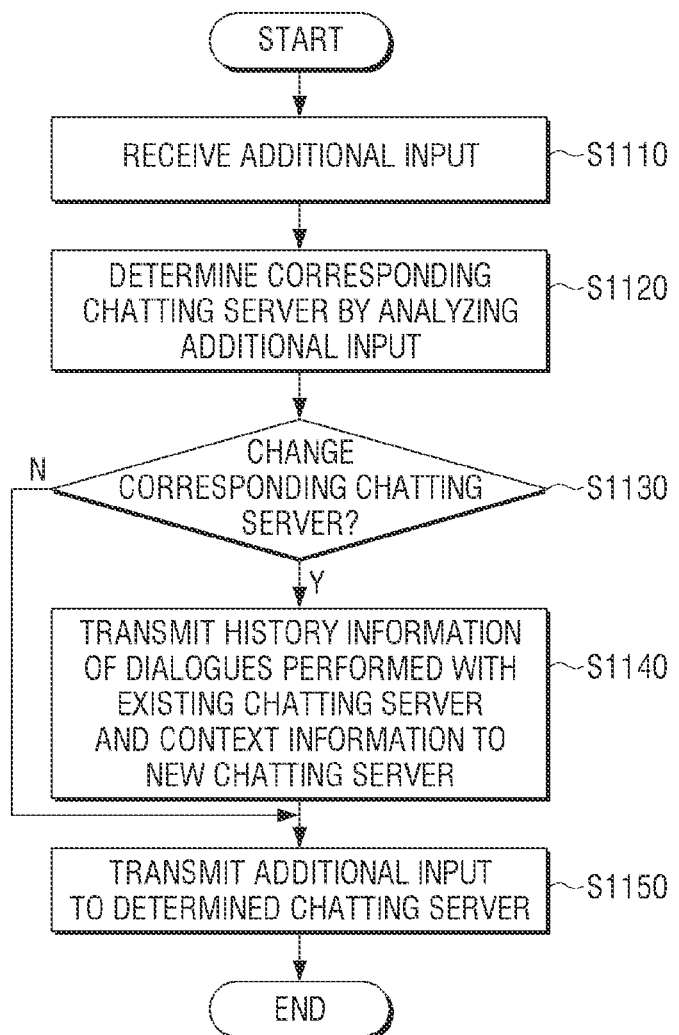

FIG. 11 is a flowchart illustrating an example method for controlling an electronic apparatus according to various embodiments of the present disclosure. FIG. 11 illustrates an example case where a chatting server is changed according to an additional natural language. Therefore, it is assumed that one of a plurality of chatting servers is determined according to an existing input natural language.

The electronic apparatus 100 may receive an additional natural language from a user after receiving a natural language at step S1110. The electronic apparatus 100 may analyze the additional natural language in the similar manner as FIG. 10 and determine a chatting server corresponding to the additional natural language at step S1120.

The electronic apparatus 100 may determine whether a chatting server that generates a response with respect to the existing natural language is the same as a chatting server corresponding to the additional natural language at step S1130. In response to a chatting server not being changed at step S1130-N, the electronic apparatus 100 may transmit the additional natural language to the chatting server and request a response with respect to the additional natural language at step S1150.

On the other hand, in response to the chatting server being changed at step S1130-Y, the electronic apparatus 100 may transmit history information of dialogues performed with the existing chatting server and context information to a new chatting server at step S1140. The electronic apparatus 100 may transmit the additional natural language to the new chatting server at step S1150. The new chatting server may generate a response based on the dialogue history information, the context information and the additional natural language and transmit the response to the electronic apparatus 100. By sharing the dialogue history information and the context information, the electronic apparatus 100 may continue to a dialogue based on the data of dialogues between the user and the existing chatting server.

Figure 12A:
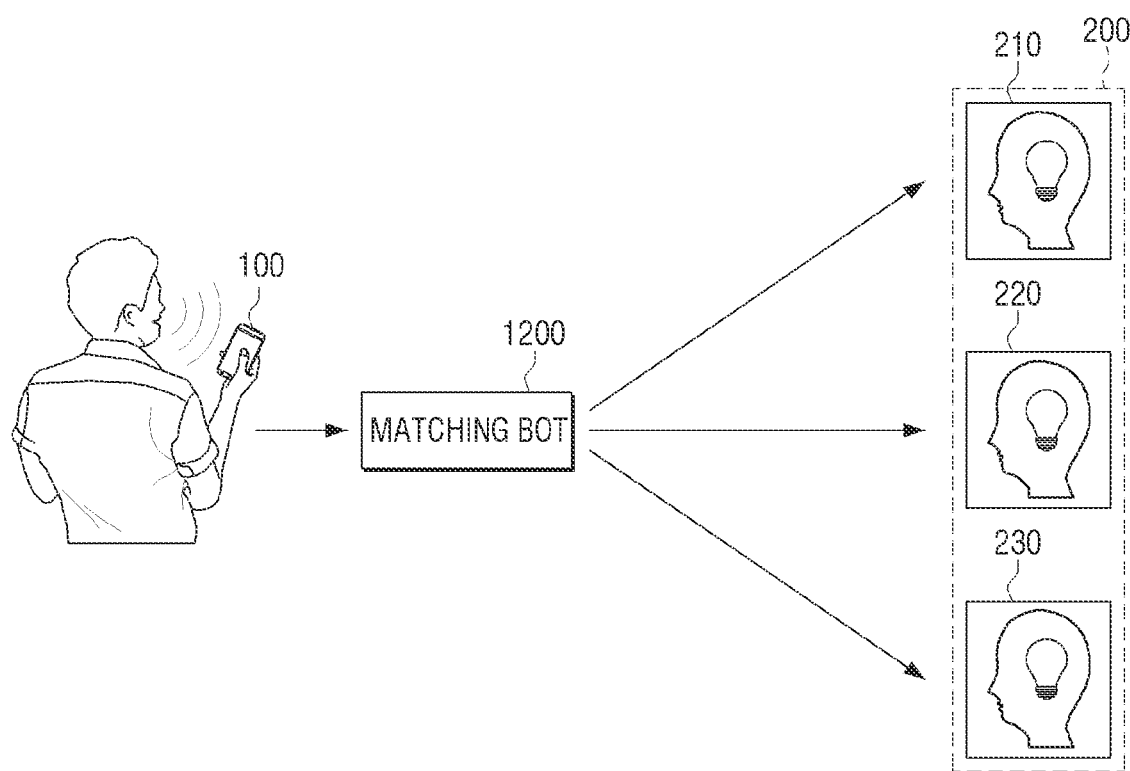
FIGS. 12A and 12B are diagrams illustrating an example concept of a chatting bot system according to another embodiment of the present disclosure.
Figure 12B:
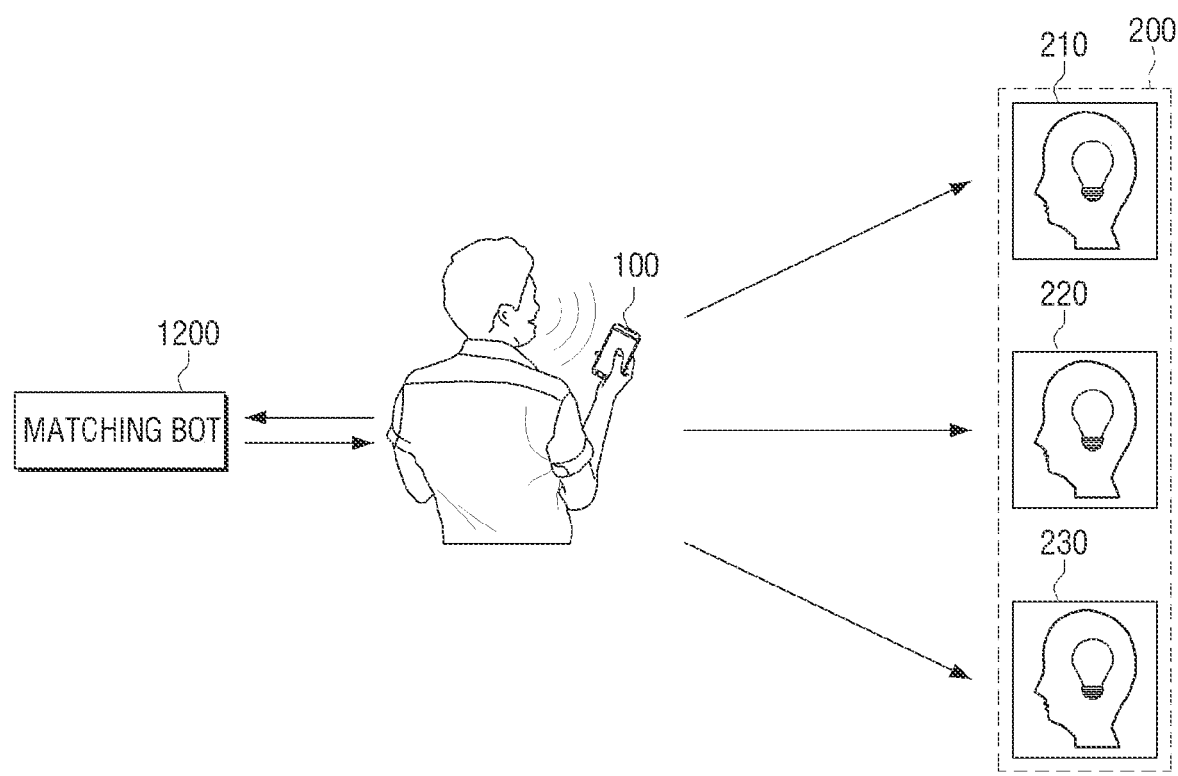

FIGS. 12A and 12B are diagrams illustrating example concepts of a chatting bot system according to another embodiment of the present disclosure.

The description of the electronic apparatus 100 and the plurality of chatting servers 210, 220 and 230 of FIGS. 12A and 12B has been described in FIG. 1. Therefore, the descriptions thereof will not be repeated here.

Referring to FIGS. 12A and 12B, a chatting bot system may include a matching bot 1200 (a matching server or a matching unit) performing communication by wire or wireless. The purpose or function of the matching bot 1200 corresponds to those of the matching bot 201 in FIG. 9.

According to an embodiment, in FIG. 12A, in response to the electronic apparatus 100 receiving a natural language input by a user, the electronic apparatus 100 may transmit the natural language to the matching bot 1200. The natural language may be text data, voice data or text data from which the voice data is preprocessed.

The matching bot 1200 may obtain identification information of a chatting server corresponding to the natural language based on the received natural language. For example, as described in FIG. 9, the matching bot 1200 may obtain identification information of the chatting server matched with the natural language using a data recognition model.

The matching bot 1200 may transmit the natural language to a chatting server corresponding to the obtained identification information of the chatting server. The matching bot 1200 may preprocess the natural language and transmit the preprocessed natural language. Based on the received natural language, the chatting server may obtain a response with respect to the natural language. The chatting server may transmit the obtained response to the electronic apparatus 100 through the matching bot 1200 or directly transmit the obtained response to the electronic apparatus 100.

According to another embodiment, as illustrated in FIG. 12B, in response to the electronic apparatus 100 transmitting the natural language to the matching bot 1200, the matching bot 1200 may obtain identification information of the chatting server matched with the natural language based on the natural language. For example, as described in FIG. 9, the matching bot 1200 may obtain the identification information of the chatting server matched with the natural language using a data recognition model. The matching bot 1200 may transmit the obtained identification information of the chatting server to the electronic apparatus 100. The electronic apparatus 100 may transmit the natural language to the chatting server corresponding to the received identification information of the chatting server. The chatting server may obtain a response with respect to the natural language and transmit the response to the electronic apparatus 100.

Figure 13:
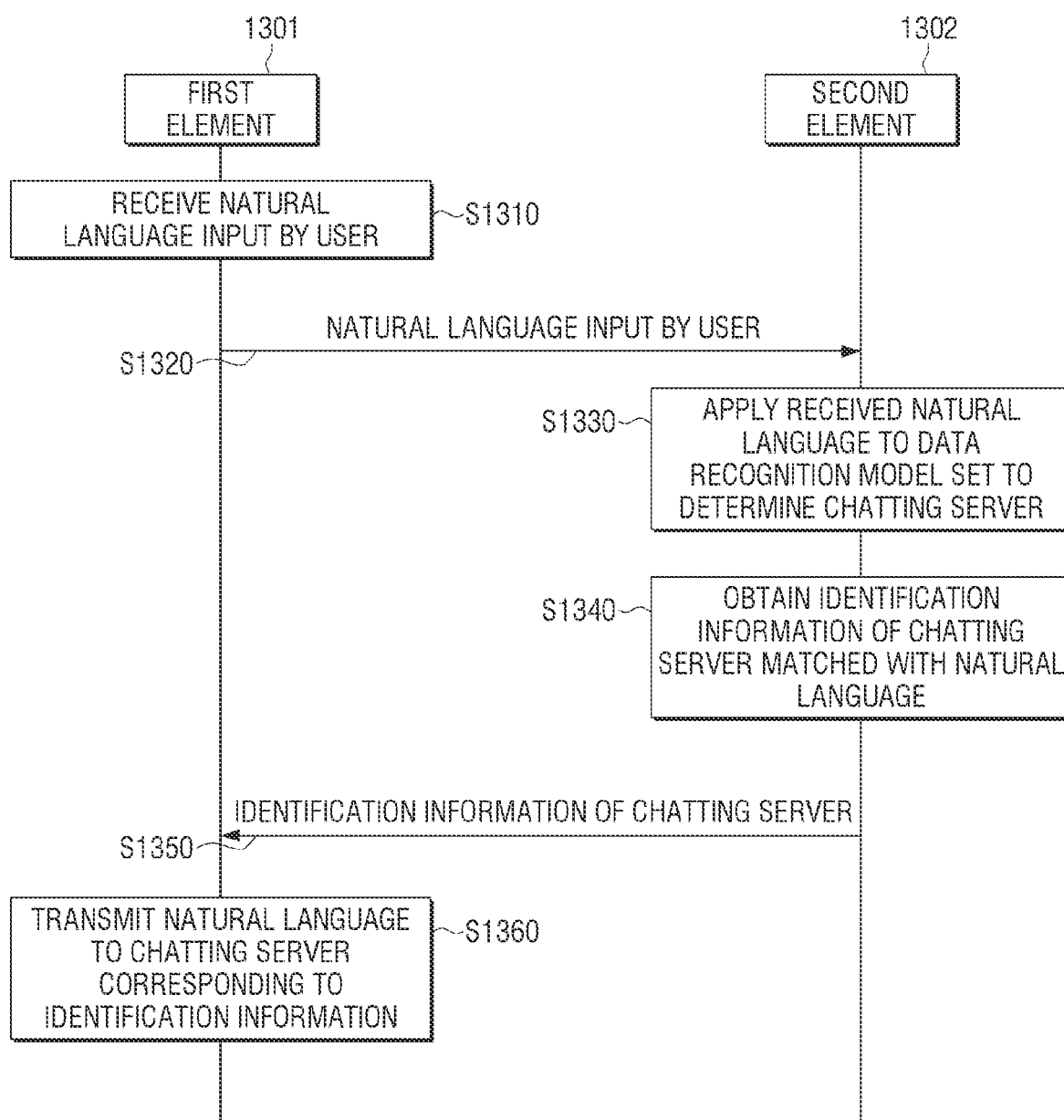
FIG. 13 is a flowchart illustrating an example method of controlling a matching bot according to an embodiment of the present disclosure.

FIG. 13 is a sequence diagram illustrating an example method for controlling a matching bot according to an embodiment of the present disclosure.

In FIG. 13, a first element 1301 may be the electronic apparatus 100, and a second element 1302 may be a server where a matching bot using the data recognition model is stored. In addition, the first element 1301 may be a generic processor and the second element 1302 may be an artificial intelligent processor. Alternatively, the first element 1301 may be at least one application and the second element 1302 may be one module of the Operation System (OS). In other words, the second element 1302 may be more integrated, specialized, less delayed, outperformed, or have more resources, thereby performing a bunch of calculations required for generating, refining and using the data recognition model more quickly and effectively than the first element 1301.

An interface for transmitting and receiving data between the first element 1301 and the second element 1302 may be defined. For example, an API having training purpose data or recognition purpose data to be applied to the data recognition model as a factor value (or an intermediate value or a transfer value).

Referring to FIG. 13, the first element 1301 may receive a natural language input by a user at step S1310.

The first element 1301 may transmit the natural language to the second element 1302 at step S1320. For example, the first element 1301 may apply the natural language as a factor value of an API function for using the data recognition model. Through the API function, the natural language may be transmitted to the second element 1302 as recognition data for applying the natural data to the data recognition model. The natural language may be processed or supplemented considering a communication format.

The second element 1302 may apply the received natural language to the data recognition model for determining a chatting server as a trained data recognition model at step S1330. As a result of applying, the second element 1302 may obtain identification information of the chatting server matched with the natural language at step S1340. The second element 1302 may transmit the obtained identification information of the chatting server to the first element 1301 at step S1350. The identification information of the chatting sever may be processed or complemented considering a communication format.

The first element 1301 that receives the identification information of the chatting server may transmit the natural language input by the user to the chatting server corresponding to the identification information at step S1360.

In response to a response with respect to the natural language input by the user being received from the chatting server, the first element 1301 may provide the received response to the user.

The above-described methods may be implemented in the form of program commands which are performed through various computers, processors, or the like, and may be recorded on a computer-readable medium. The computer readable medium may include program commands, data files, and data structures either alone or in combination. The program commands recorded in the computer-readable recording medium may be especially designed and implemented for the present disclosure or be known to those skilled in a field of computer software. Examples of the computer-readable medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer using an interpreter. The hardware device may be configured to operate as one or more software modules to perform the operation of the present disclosure, and the reverse can be applied.

A method according to embodiments may be implemented with a computer program product.

Examples of the computer program product may include a S/W program, a computer readable recording medium where the S/W program is stored or a product traded between a seller and a buyer.

For example, examples of the computer program product may include the electronic apparatus 100, the server 200, the matching bot 1200 or a product in the form of S/W program (e.g. a downloadable application) distributed on electronic systems through a manufacturer of the manufacturer of the above devices or an application store. For electronic distribution, at least part of the S/W program may be stored in a recoding medium, or temporarily generated. In this case, the recoding medium may be included in a server of the manufacturer or the application store or a transmission server.

Although various example embodiments have been illustrated and described, it will be appreciated by those skilled in the art that changes may be made to these example embodiments without departing from the principles, spirit and scope of the present disclosure. Accordingly, the scope of the present disclosure is not limited to the described example embodiments, but is defined by the appended claims as well as equivalents thereto.

What is claimed is:

1. An electronic apparatus, comprising:
    an input unit comprising input circuitry;
    a communicator comprising communication circuitry configured to perform communication with a plurality of second AI (Artificial Intelligence) models; and
    a processor configured to:
    receive at least one sentence through the input unit, based on the at least one sentence being input to a first trained AI model, obtain, through use of the first trained AI model, identification information of a second AI model corresponding to the at least one sentence from among the plurality of second AI models according to a characteristic of the at least one sentence, and control, based on the identification information of the second AI model corresponding to the at least one sentence, the communicator to transmit information of the at least one sentence to the second AI model corresponding to the at least one sentence in order to receive a response with respect to the at least one sentence by the second AI model corresponding to the at least one sentence.

2. The electronic apparatus as claimed in claim 1, wherein the processor is further configured to:

perform a preprocessing of a natural language input including the at least one sentence, analyze a characteristic of the preprocessed natural language and the characteristic of the user and identify a chatting server corresponding to the preprocessed natural language from among the plurality of second AI models, and control the communicator to transmit the preprocessed natural language to the identified chatting server.

3. The electronic apparatus as claimed in claim 2, wherein the processor is further configured to:

with respect to each of the plurality of second AI models, determine at least one of: a first matching score with respect to the preprocessed natural language, a second matching score with respect to a dialogue pattern including the preprocessed natural language, a third matching score with respect to emotion of the user and a fourth matching score with respect to the characteristic of the user, with respect to each of the plurality of second AI models, determine a final matching score with respect to each of the plurality of second AI models using at least one of the first to fourth matching scores, and identify a chatting server having a highest final matching score among the plurality of second AI models as the chatting server corresponding to the preprocessed natural language.

4. The electronic apparatus as claimed in claim 3, wherein the first matching score is determined based on weighted values given to words of the preprocessed natural language and a Term Frequency/Inverse Document Frequency (TF/IDF) value, wherein the second matching score is determined based on a similarity to pre-stored dialogue pattern data, wherein the third matching score is determined based on sentiment analysis and emotion analysis of the preprocessed natural language, and wherein the fourth matching score is determined based on at least one of: age, gender, region and education of the user.

5. The electronic apparatus as claimed in claim 1, further comprising:

a memory configured to store history information of dialogues performed with the second AI model corresponding to at least context information with respect to a situation in which the at least one sentence is input.

6. The electronic apparatus as claimed in claim 1, wherein the processor is further configured to:

in response to receiving an additional natural language through the input unit after receiving a natural language input including the at least one sentence, identify a second AI model corresponding to the additional natural language from among the plurality of second AI models by analyzing a characteristic of the additional natural language and the characteristic of the user, and in response to the second AI model corresponding to the natural language being different from the second AI model corresponding to the additional natural language, control the communicator to transmit the additional natural language to the second AI model corresponding to the additional natural language.

7. The electronic apparatus as claimed in claim 6, wherein the processor is further configured to control the communicator to transmit history information of dialogues performed with the second AI model corresponding to the natural language and context information together with the additional natural language to the second AI model corresponding to the additional natural language.

8. The electronic apparatus as claimed in claim 1, wherein the characteristic of the at least one sentence is a matching score with respect to each of the plurality of second AI models.

9. The electronic apparatus as claimed in claim 1, wherein the plurality of second AI models comprise two or more of: a first chatting server, a second chatting server and a third chatting server, wherein the first chatting server is a chatting server configured to provide a response corresponding to a natural language input included in the at least one sentence using pre-stored response data base, wherein the second chatting server includes a chatting server configured to provide a response by identifying a context of the natural language input using a first response model, and wherein the third chatting server includes a chatting server configured to provide a response by inferring a question included in the natural language input using a second response model.

10. The electronic apparatus as claimed in claim 1, wherein the processor is further configured to train the first trained AI model based on the at least one sentence and/or the response with respect to the at least one sentence.

11. The electronic apparatus as claimed in claim 1, wherein the second AI model corresponding to the at least one sentence is trained based on the at least one sentence and/or the response with respect to the at least one sentence.

12. A method for controlling an electronic apparatus, the method comprising:

receiving at least one sentence as an input;

based on the at least one sentence being input to a first trained AI model, obtaining, through use of the first trained AI model, identification information of a second AI model corresponding to the at least one sentence from among a plurality of second AI models according to at least a characteristic of the at least one sentence; and transmitting, based on the identification information of the second AI model corresponding to the at least one sentence, information regarding the at least one sentence to the second AI model corresponding to the at least one sentence and receiving a response with respect to the at least one sentence.

13. The method as claimed in claim 12, further comprising:

performing a preprocessing of a natural language including the at least one sentence, wherein the identifying comprises analyzing a characteristic of the preprocessed natural language and the characteristic of the user and identifying a chatting server corresponding to the preprocessed natural language from among the plurality of second AI models, and wherein the transmitting comprises transmitting the preprocessed natural language to the identified chatting server.

14. The method as claimed in claim 13, wherein the identifying further comprises:

with respect to each of the plurality of second AI models, determining a first matching score with respect to the preprocessed natural language, a second matching score with respect to a dialogue pattern including the preprocessed natural language, a third matching score with respect to emotion of the user and a fourth matching score with respect to the characteristic of the user;

with respect to each of the plurality of second AI models, determining a final matching score for each of the plurality of second AI models using at least one of the first to fourth matching scores; and identifying a second AI model having a highest final matching score among the plurality of second AI models as the chatting server corresponding to the preprocessed natural language.

15. The method as claimed in claim 14, wherein the first matching score is determined based on weighted values given to words of the preprocessed natural language and a Term Frequency/Inverse Document Frequency (TF/IDF) value, wherein the second matching score is determined based on a similarity to pre-stored dialogue pattern data, wherein the third matching score is determined based on sentiment analysis and emotion analysis of the preprocessed natural language, and wherein the fourth matching score is determined based on at least one of: age, gender, region and education of the user.

16. The method as claimed in claim 12, further comprising:

storing history information of dialogues performed with the second AI model corresponding to a natural language including the at least one sentence and context information with respect to a situation in which the natural language is input.

17. The method as claimed in claim 12, further comprising:

receiving an additional natural language from the user after receiving a natural language input including the at least one sentence;

identifying a second AI model corresponding to the additional natural language from among the plurality of second AI models by analyzing a characteristic of the additional natural language and the characteristic of the user; and in response that the second AI model corresponding to the natural language being different from the second AI model corresponding to the additional natural language, transmitting the additional natural language to the second AI model corresponding to the additional natural language.

18. The method as claimed in claim 17, wherein the transmitting of the additional natural language comprises transmitting history information of dialogues performed with the second AI model corresponding to the natural language and context information together with the additional natural language to the second AI model corresponding to the additional natural language.

19. The method as claimed in claim 12, wherein the characteristic of the at least one sentence comprises matching score with respect to each of the plurality of second AI models.

20. The method as claimed in claim 12, wherein the plurality of second AI models comprise two or more of: a first chatting server, a second chatting server and a third chatting server, wherein the first chatting server is a chatting server configured to provide a response corresponding to a natural language input included in the at least one sentence using pre-stored response data base, wherein the second chatting server is a chatting server configured to provide a response by identifying a context of the natural language input using a first response model, and wherein the third chatting server is a chatting sever configured to provide a response by inferring a question included in the natural language input using a second response model.

21. The method as claimed in claim 12, further comprising training the first trained AI model based on the at least one sentence and/or the response with respect to the at least one sentence.

22. The method as claimed in claim 12, wherein the second AI model corresponding to the at least one sentence is trained based on the at least one sentence and/or the response with respect to the at least one sentence.

23. A computer program product comprising commands stored in non-transitory computer-readable recording medium, the commands, when executed by a processor, causing an electronic apparatus, to perform operations comprising:

receiving at least one sentence as an input;

based on the at least one sentence being input to a first trained AI model, obtaining, through use of the first trained AI model, identification information of a second AI model corresponding to the at least one sentence from among a plurality of second AI models according to at least a characteristic of the at least one sentence; and transmitting, based on the identification information of the second AI model corresponding to the at least one sentence, information regarding the at least one sentence to the second AI model corresponding to the at least one sentence and receiving a response with respect to the at least one sentence.

* * * * *